US 11,770,510 B2

(12) United States Patent
Sviridenko

(10) Patent No.: US 11,770,510 B2
(45) Date of Patent: Sep. 26, 2023

(54) VIDEO INFORMATION COMPRESSION USING SKETCH-VIDEO

(71) Applicant: Andrew Sviridenko, Moscow (RU)

(72) Inventor: Vladimir Alexandrovich Sviridenko, Moscow (RU)

(73) Assignee: Andrew Sviridenko, Moscow (RU)

( * ) Notice: Subject to any disclaimer, the term of this patent is extended or adjusted under 35 U.S.C. 154(b) by 580 days.

(21) Appl. No.: 16/949,501

(22) Filed: Oct. 30, 2020

(65) Prior Publication Data

US 2021/0076016 A1 Mar. 11, 2021

Related U.S. Application Data

(63) Continuation of application No. PCT/RU2019/050108, filed on Jul. 9, 2019.

(30) Foreign Application Priority Data

Sep. 21, 2018 (RU) .......................... RU2018133510

(51) Int. Cl.
  *H04N 9/64* (2023.01)
  *G06T 11/60* (2006.01)
  (Continued)

(52) U.S. Cl.
  CPC ................ *H04N 9/64* (2013.01); *G06T 1/60* (2013.01); *G06T 3/4007* (2013.01);
  (Continued)

(58) Field of Classification Search
  CPC ...... H04N 9/64; H04N 19/117; H04N 19/136; H04N 19/142; H04N 19/17; H04N 19/85;
  (Continued)

(56) References Cited

U.S. PATENT DOCUMENTS 7,136,066 B2 * 11/2006 Li ........................ H04N 19/169
    345/428
7,912,090 B2 * 3/2011 Yu ....................... H04L 12/5602
    370/252

(Continued)

FOREIGN PATENT DOCUMENTS

FR  3083662 A1  1/2020
FR  3102026 A1  4/2021

(Continued)

OTHER PUBLICATIONS

Alizar, Google neural network compresses photos better than JPEG, Aug. 25, 2016, 11 pages, Accessed Online on Sep. 11, 2020, https://habr.com/en/post/372607/.

(Continued)

*Primary Examiner* — Helen Shibru
(74) *Attorney, Agent, or Firm* — MLO, a professional corp.

(57) ABSTRACT

A method involves receiving a color video signal having a first frame rate. The color video signal is pre-processed to produce a pre-processed color video stream. The pre-processed color video stream is transformed into a monochromatic sketch stream. The first frame rate of the sketch stream is adapted to a second frame rate in accordance with dynamics of objects in a scene and are encoded to produce an encoded sketch stream. Frame-hints are produced using the pre-processed color video stream and are encoded to produce encoded frame-hints. The encoded sketch stream is multiplexed with the encoded frame-hints and service data to produce multiplexer output data which is transmitted via a communication channel or stored in a data storage system.

20 Claims, 12 Drawing Sheets

(51) Int. Cl.
*H04L 65/70* (2022.01)
*H04L 65/75* (2022.01)
*G06T 3/40* (2006.01)
*G06T 9/00* (2006.01)
*G06T 11/20* (2006.01)
*G06T 1/60* (2006.01)

(52) U.S. Cl.
CPC .......... *G06T 3/4023* (2013.01); *G06T 3/4046* (2013.01); *G06T 9/002* (2013.01); *G06T 11/203* (2013.01); *H04L 65/70* (2022.05); *H04L 65/75* (2022.05)

(58) Field of Classification Search
CPC .. H04N 19/132; H04N 19/537; H04N 21/238; G06T 3/4007; G06T 3/4023; G06T 3/4046; G06T 11/203; G06T 11/60; G06T 9/001; G06T 1/00; H04L 65/70; H04L 65/75; G06N 3/045; G06N 3/08; G06F 17/00
USPC ........................................................ 386/328
See application file for complete search history.

(56) References Cited

U.S. PATENT DOCUMENTS

| | | | | |
|---|---|---|---|---|
| 7,916,794 | B2* | 3/2011 | Li | H04N 19/13 375/240.26 |
| 10,373,300 | B1 | 8/2019 | Besenbruch et al. | |
| 10,489,936 | B1 | 11/2019 | Zafar et al. | |
| 11,363,298 | B2* | 6/2022 | Lee | H04N 19/172 |
| 2005/0135480 | A1 | 6/2005 | Li et al. | |
| 2006/0215014 | A1 | 9/2006 | Cohen et al. | |
| 2020/0014942 | A1 | 1/2020 | Hillar et al. | |
| 2020/0336751 | A1* | 10/2020 | Hillar | H04N 19/60 |
| 2021/0112256 | A1* | 4/2021 | Priebe | G06N 3/088 |

FOREIGN PATENT DOCUMENTS

| | | |
|---|---|---|
| WO | 2021022685 A1 | 2/2021 |
| WO | 2021022686 A1 | 2/2021 |

OTHER PUBLICATIONS

Alizar, Pix2pix neural network realistically colors pencil sketches andblack and white photos, Nov. 22, 2016, 13 pages, Accessed Online on Oct. 29, 2020, https://habr.com/en/post/399469/.

Gitman, Applying concurrent networks for machine learning tasks, Moscow, Apr. 2016, 31 pages. (machine translation included).

Information Theory, Wikipedia, 13 pages, Last Edited on Aug. 27, 2020, Accessed Online on Sep. 10, 2020, https://en.wikipedia.org/wiki/Information_theory.

Ivanov et al., JPEG and wavelet-compression of the object and background image with varying degrees of quality. Bulletin of the National Technical University Kharkov Polytechnic Institute, Series: Computer Science and Modeling, 2007, 12 pages. (machine translation included).

Kin and Coker, Video Compression Using Recurrent Convolutional Neural Networks, 2017, 6 pages.

Matsuda et al., A Machine Learning Approach to Reducing Image Coding Artifacts, 2017 25th European Signal Processing Conference (EUSIPCO), Aug. 2017, 5 pages.

The Zettabyte Era: Trends and Analysis, White Paper, Cisco, Jul. 2016, 36 pages.

Vatolin et al., Data compression methods. How archivers are made, image and video compression, Moscow, Dialog-MEPhI, 2002, 381 pages. (machine translation included).

Vavrenyuk et al., Data Compression Methods, Journal of Theoretical and Applied Information Technology, vol. 80, No. 2, Oct. 20, 2015, pp. 202-210.

* cited by examiner

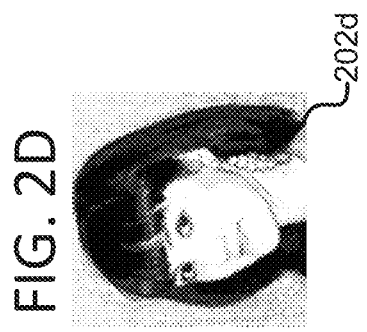
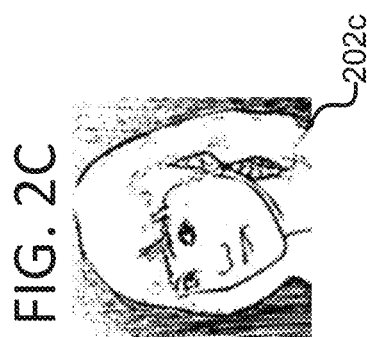
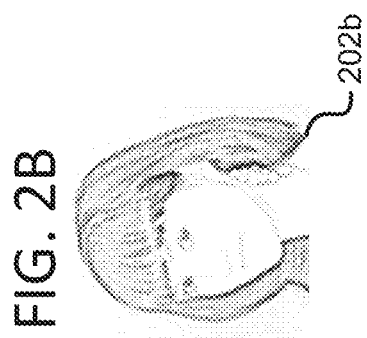
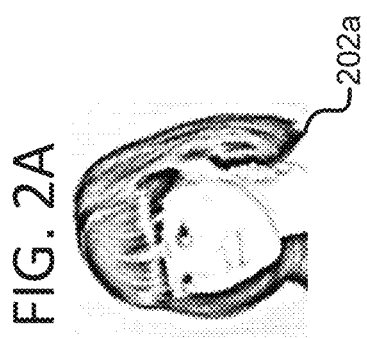

300B

400B

VIDEO INFORMATION COMPRESSION USING SKETCH-VIDEO

RELATED APPLICATIONS

The application is a continuation of PCT Application PCT/RU2019/050108, filed Sep. 7, 2019, which claims the benefit of Russian Patent Application RU2018133510, filed Sep. 21, 2018, all of which are hereby incorporated by reference for all purposes.

FIELD OF THE INVENTION

The invention relates to the field of compression/coding, transmission and storage in a compact form of video information (VI) present in multimedia data transmission/data storage systems (primarily video and images, which occupy the majority of data traffic in IP networks), including video streaming systems, video conferencing, video surveillance, video analytics, TV and radio broadcasting, data storage systems, data centers, as well as search engines.

BACKGROUND

Video at a given bitrate/volume of video information (VI) and the characteristics of the data transmission or storage medium of the VI should be kept at an acceptable level of visual quality for an information recipient (viewer) using the VI as part of an application given video transmission through non-stationary communication channels with relatively low and/or changing bandwidth, which imposes additional requirements on the flexibility of processing and encoding of a video stream for data transmission in a diverse network environment and/or environment for processing and storing VI in digital form.

Currently, the prevailing traffic in all types of data networks is multimedia traffic, in which video occupies the largest place. According to the forecast of a number of IT centers and large companies, the estimation of the video traffic volume on the Internet is 73-75% (data from 2016) and it is growing significantly annually. According to some forecasts ("*The Zettabyte Era: Trends and Analysis*", *CISCO*), by 2021, its share will be 82% of the total internet protocol (IP) traffic (and this is exabyte volumes). This is why at present, and in the long term, the methods of processing and encoding video streams and images for data compression are very relevant, which can significantly reduce these ever-increasing volumes of video and thereby at least partially unload communication systems for transmission and memory devices for recording in storage systems.

As is known in the art, source coding methods are widely used to compress data with some loss and without loss, which can reduce their natural redundancy and save resources of data transmission systems (DTS), data processing systems (DPS) and data storage systems (DSS), as well as information retrieval systems by reducing the initial amount of data generated by their source. The information-theoretical aspect of the data compression presented in digital form was developed in the works of C. Shannon and other researchers and was determined by the rate-distortion function (RDF) or $R = f(e)$, where R is the data stream bitrate in bit/s at the output of the source encoder, and e is the error or distortion at reproducing data on the output of the source decoder (lossless compression can provide $e=0$ for some types of data), as applied to the data transmission over the communication channel with bandwidth C bit/s. To ensure normal communication, the relationship $R \le C$ must be fulfilled. Here, R and e act as the main (non-negative and dependent on each other) criteria for the quality of the source coding, and an increase in the bitrate R leads to a decrease in distortion (loss) e, and a decrease in bitrate leads to a greater degradation of the transmitted data. With regard to video transmission/storage, so-called lossy data compression (for $e>0$) is often implemented, i.e., encoding the data stream at the source output in the absence of errors in the channel and fulfilling the transmission condition $R \le C$, which controls the level of information loss $e>0$, which can be estimated at the output of the source decoder, as is understood in the art.

For a given loss value $e^*$, the value $R^* = f(e^*)$ determines the lower limit of the data rate. The specificity of the approach to data compression based on the information-theoretical basis of RDF is the postulate: it is impossible to make up for losses. For a certain class of sources (text data, graphics, black-and-white images, etc.), the value of e, as noted above, can be made equal to zero at encoding, i.e., lossless data compression (at $e=0$). In implementation, coding delay and coding complexity used as additional criteria (factors) should be limited for real applications.

A characteristic of the compression efficiency of data in digital form is the compression ratio (CR) $CR = Iin/Iout$, where Iin is the amount of information in bits (or bytes) at the source output (generated over a certain time interval T, if the data stream at the source output is analyzed, i.e., at the input of the source encoder; or pre-recorded video in a memory device limited in volume), and Tout is the amount of information at the output of the source encoder (for the above time interval T, if the result of data stream encoding at the output of the source encoder is analyzed, or the VI is processed by the encoder before the VI is recorded in the memory device). Losses e in this definition of compression efficiency are fixed. The efficiency of data compression depends on the level of their redundancy, specifics and intensity of noise and interference in the source data, but also on the coding method and its ability to reduce or even eliminate this redundancy, as is understood in the art.

Multimedia data, such as video/images or speech/audio are examples of output data from a source (e.g., photo and video camera or microphone) or a storage device. If necessary, their transformation to digital form and coding necessarily introduces error e, which determines the quality of digitization and coding. When assessing the quality of coded video data, objective quality criteria are widely used (such as root mean square error (RMS) and its variants, maximum error A and signal to noise ratio (SNR) or peak SNR (PSNR)), Video Multimethod Assessment Fusion, proposed by NETFLIX), as well as objective-subjective ones (such as the MOS criterion (Mean Opinion Score)), which is an average quality estimation of the restored information at the decoder output with respect to the original VI obtained by a limited team of trained viewers/listeners or even subjective visual/auditory representations of the group or an individual viewer/listener, as is understood in the art.

For image encoding standards, JPEG, JPEG-2000, MJPEG and other codecs of this class which are functionally close to them, including lossless compression options for a digital copy of the image, are conventionally used. MPEG-1, MPEG-2, MPEG-4 codecs or their versions in the form of standards (Recommendations) ITU-T H.26x (H.261, H.262, H.263, H.264, H.265), as well as proprietary codecs VP8, VP9, AV1, etc. are conventionally used for video encoding [D. Vatolin et al. *Data compression methods. How archivers are made, image and video compression. Moscow, Dialog-*

*MEPhI*, 2002 (in Russian); V. Ivanov et al. *JPEG and wavelet-compression of the object and background image with varying degrees of quality. Bulletin of the National Technical University Kharkov Polytechnic Institute. Series: Computer Science and Modeling.* 2007].

The compression ratio of video with loss CR varies from 10 to 100 times with "television quality" SD (Standard Definition) and even higher quality HD (High Definition) depending on the specifics and statistical and psychophysical redundancy of images/video, the type of codec and the values of its parameters (delay, complexity, etc.), the viewer's requirements for the quality of the restored video, the acceptable video stream bitrate or the allocated memory for storage of images/video and other factors.

The principle of image and video lossy compression, widely used in such codecs, under the assumption that they are color (in particular monochrome, black-and-white (B/W) grayscale) and are presented in the well-known Red-Green-Blue (RGB) or YUV format), is as follows: elimination of spatial redundancy of a mainly statistical type based on the transition from a spatial domain into a frequency domain by transforming the image matrix as in JPEG or a reference frame, as in MPEG 2 and 4, and using a system of orthogonal functions (Fourier, Walsh transform, discrete cosine transform (DCT), wavelets, etc.) and fine or coarse quantization of components, which introduces an error e, and subsequent coding of the quantized components on the principles of lossless entropy coding (in particular, arithmetic coding); elimination of temporal redundancy of mainly statistical types in adjacent frames of a video sequence, in which, as a rule, there are small changes due to movement of objects within the scene and/or video camera detected by a motion estimator and determination of motion vectors for encoding only changed fragments of a new frame in relation to the reference frame (as described in detail in the MPEG 2 and 4 standards, H.26x).

The level of losses (errors) e can be lowered to zero, which occurs in codecs that provide lossless compression [D. Vatolin et al. *Data compression methods. How archivers are made, image and video compression. Moscow, Dialog-MEPhI*, 2002 (in Russian)]. An example is the ZIP and RAR archivers, which are widely used for encoding symbolic and graphic information, by RLE, LZW, and Huffman methods, as well as the entropy (primarily arithmetic) codecs in the standard image and video data compression methods noted above, but they have relatively small independent usage for encoding video information due to very low compression efficiency (a data compression ratio of two to ten is considered quite normal for encoding texts/graphics). Typically, these methods are used as part of a general method for compressing video and graphics (mostly two-level) data. In relation to the processing of the latter ones (bi-level images), the JBIG and JBIG2 standards have been developed, as is understood in the art. If JBIG, which is based on arithmetic coding, is focused on lossless compression, then its evolution JBIG2 is capable to realize efficient graphics processing, also in lossy compression mode.

One of the features of this classical information-theoretic approach is that when decoding information transmitted through channels of a data transmission network or stored in compressed form in the storage system, it is necessary to reproduce the information in the highest quality and, possibly, with a small controlled error e, which is a certain payment for a relatively high compression ratio CR of the initial data volume Iin. A very high-quality (HD) original color video at a frame rate 30 fps may require a bitrate of at least R=50 Mbps, and a relatively low quality of the original video stream may require a bitrate of R=128 Kbps at a frame rate of 16 to 25 fps, although lower frame rates may also be considered, as is in the case video surveillance. The difference between a high-bitrate video stream and a low-bitrate one, with respect to the R parameter, is almost 400 times. Obviously, the visual representation made to the viewer (recipient) of such types of video will be different. But, as can be assumed, to solve a certain type of applied problem, rather than address an artistic aesthetic, which is needed, for example, for storing movies in digital form with high quality, this is acceptable.

Compression of HD-video with losses (by the above-mentioned advanced video codecs) is 50 to 100 times. Such compression reduces, of course, quality, but leaves video quality at an acceptable level for various real applications. But, the compression of only 5 to 10 times for low-bitrate video streams often leads to a significant decrease (if not degradation) in quality even for a rough solution of applied problems.

However, such an approach "at the signal level" (as it can be called traditionally), as is widely descripted in technical literature and presented primarily by the pointed "standards", forms a fundamental boundary of coding efficiency of the video information source, as determined by the Shannon's "Rate-Distortion" function due to the requirement that such compression be capable to "reproduce the complete signal (images or video) practically in its original form, but with relatively small controlled losses", so that a viewer or a device almost does not notice these losses upon review.

This approach assumes that almost everything is important in reproduction and perception, i.e., a viewer or a recognizing machine must get everything in detail when decoding an image/video even in situations where the full color video (or its fragments) as a whole does not carry information that is important for the viewer when solving applied problems and making decisions about essential objects, situations or events that are presented in the video stream (here the artistic, aesthetic components of the video stream are partially excluded from consideration when it is perceived by the viewer as art).

At the semantic and pragmatic levels, the loss of "non-essential" information for the application (for example, changing the color of clothes or reducing the number of gray gradations, moving objects of little interest to the viewer in the scene, etc.) does not reduce the value of the video data from the applied experience for the viewer, but the transformation (and even exclusion) of this information can significantly improve the coding efficiency based on the CR criterion.

Assessing the value of objects in the image (significant and non-essential fragments of the scene) depends on the application and the viewer, but the general approach in this case is as follows: to transmit/reproduce valuable fragments of images/videos (for example, faces of people or some important objects) with greater accuracy, and low-value ones (for example, background, non-essential objects in the frame) transmit/reproduce with less accuracy, which is reflected in a number of publications and patents [V. Ivanov et al. *JPEG and wavelet-compression of the object and background image with varying degrees of quality. Bulletin of the National Technical University Kharkov Polytechnic Institute. Series: Computer Science and Modeling.* 2007].

At the same time, the approach based on the "Rate-distortion" function for the described situation remains practically unchanged (even if only for particular situations), it is just that some specially selected image fragments or frames of the video stream are encoded with a smaller error, and others with a larger error (up to changing their visual presentation to the viewer).

In connection with a new stage in the development and application of artificial neural networks (ANNs), publications have appeared in which the encoder and decoder for images/video are based on the ANN and in some applications provide data compression that is not inferior in effectiveness to traditional video stream processing. For example, in the article "*Google Neural Network Compresses Photos Better than JPEG*", Aug. 25, 2016, Retrieved from the internet: <URL: https://habr.com/post/372607/>, it is stated that the neural network from GOOGLE for images compression, which is implemented on the basis of the free TENSORFLOW machine learning library, provides even 5% to 57% higher efficiency (based on CR)) than JPEG on some types of images, sized 1280×720 pixels, at strong compression (0.25 bit/pixel).

The article "*Video Compression Using Recurrent Convolutional Neural Networks*", C. Y. S. Kin and B. Coker, Retrieved from the internet: <URL: http://http://cs231n.stanford.edu/reports/2017/pdfs/423.pdf> describes the concept of image compression based on the implementation of encoding and decoding using the parallel structure of the ANN and the concept of discrete wavelet transform (DWT).

In a series of articles, ANNs are used to optimize the parameters of quantization and coding, which may affect the characteristics of the video codec, but in percentage terms it is insignificant [A Machine Learning Approach to reducing Image Coding Artifacts. Ichiro Matsuda et al. 25 European Signal Processing Conference. 2017.]

However, ANN-based approaches to image compression are still being studied scientifically, not practically.

One of the solutions to the problem of real-time transmission of a video stream over a channel with a very low bandwidth for video conferencing based on morphing and frame editing technology to reduce frame rate in order to preserve only their essential (for the viewer) part is described in the US patent publication No. 2006/0215014, published Sep. 28, 2006, Cohen et al. On the encoder side, the proposed system is able to automatically select only a small number of frames with relatively high-quality faces represented in them, then encode these frames for data compression and transmission. On the decoder side, morphing technology (i.e., smooth transformation of one object into another) is used to restore the video stream with normal frame rate. According to the authors of the patent, the results show that such a system is superior to the quality of traditional video coding for low-bitrate transmission.

In US patent publication No. 2005/0135480, published Jun. 23, 2005, Li, et al., concerning the transmission of a video stream over a low-bitrate communication channel (the patent refers to bitrates of 9.6 kbit/s to 40 kbit/s; video in QCIF format (image size in pixels is 176×144)), in order to exclude the degradation of color or grayscale video, it is proposed to switch to a sketch representation of each frame of a video sequence by comparing the brightness of each pixel with an adaptive threshold. In fact, it is proposed to translate the image in each frame into a bi-level graphic form, encode the received sketch by a lossless arithmetic codec, transmit the encoded sketch video through the communication channel, and decode the received sketch video, which is displayed on the user's monitor/screen. The authors of the patent claim that the sketch video smoothly conveys the change in facial features and expressions and provides correct and smooth transmission of the movement of objects, which is important for video communication, but this does not occur when using video coding based on the H.263 codec, focused on rough color reproduction at low bitrate coding.

Thus, traditional encoding methods are aimed at eliminating natural (primarily statistical and psychophysical) redundancy which can be restored (supplemented) with controlled losses in one or another form when decoding a video stream or its separate frame or group of frames. However, such methods do not exhaust all the answers to the question, "what is valuable and what is superfluous for solving a specific applied problem?" for conserving the basis of the video stream and its dynamics.

For example, such a "redundant" part of the video may be a too large color palette, which is usually provided within scopes of SD or HD video quality as its important component, and even the color of each object in the displayed scene; or an excessive number of gradations of brightness (or gray levels) for a digital raster grayscale image, and it is possible to use only two or even one bit to represent it, i.e., actually transform the grayscale image (or a separate frame of the video stream) into a binary (graphic) black-and-white image in brightness, which is an object of encoding in the JBIG and JBIG 2 standards, as is understood in the art; or separate objects in the scene observed in the video (primarily the background) are not of obvious interest and the transmission/storage of their images can be described more roughly, presented in a truncated form, and even excluded from the scene for more efficient encoding of a 2D image of a scene. However, objects of interest for the viewer or their parts thereof (for example, faces of people or separate objects which are important to the viewer) are reproduced during decoding with higher quality.

SUMMARY

In some embodiments, a method involves receiving a color video signal having a first frame rate. The color video signal is pre-processed to produce a pre-processed color video stream. The pre-processed color video stream is transformed into a monochromatic sketch stream. The first frame rate of the sketch stream is adapted to a second frame rate in accordance with dynamics of objects in a scene. The sketch stream is encoded to produce an encoded sketch stream. Frame-hints are produced using the pre-processed color video stream. The frame-hints are encoded to produce encoded frame-hints. The encoded sketch stream is multiplexed with the encoded frame-hints and service data to produce multiplexer output data. The multiplexer output data is transmitted via a communication channel or stored in a data storage system.

In some embodiments, a method involves receiving, using a video information source, a color video signal having a first frame rate. The color video signal is pre-processed, using a video pre-processing unit, to produce a pre-processed color video stream. Objects of interest are detected in the pre-processed color video stream using a trained artificial neural network unit. Information about the detected objects of interest is assembled, using a service data assembling unit, into service data. The pre-processed color video stream is transformed into a monochromatic sketch stream using a sketch-video converter unit. The first frame rate of the sketch stream is adapted to a second frame rate using an interpolator-based frame decimator unit. An encoded sketch stream is produced using the sketch stream, using a first encoder unit. Frame-hints using the pre-processed color video stream are received, using a first switch unit. The frame-hints are encoded, using a second encoder unit, to produce encoded frame-hints. The encoded sketch stream is multiplexed, at a multiplexer unit, with the encoded frame-hints and the service data to produce multiplexer output data. The multiplexer output data is transmitted, from the multiplexer unit, via a communication channel or stored in a data storage system.

BRIEF DESCRIPTION OF THE DRAWINGS

FIGS. 2A-2D show different versions of sketch-versions based on a single original color image, in accordance with some embodiments.

DETAILED DESCRIPTION

Figure 1A:
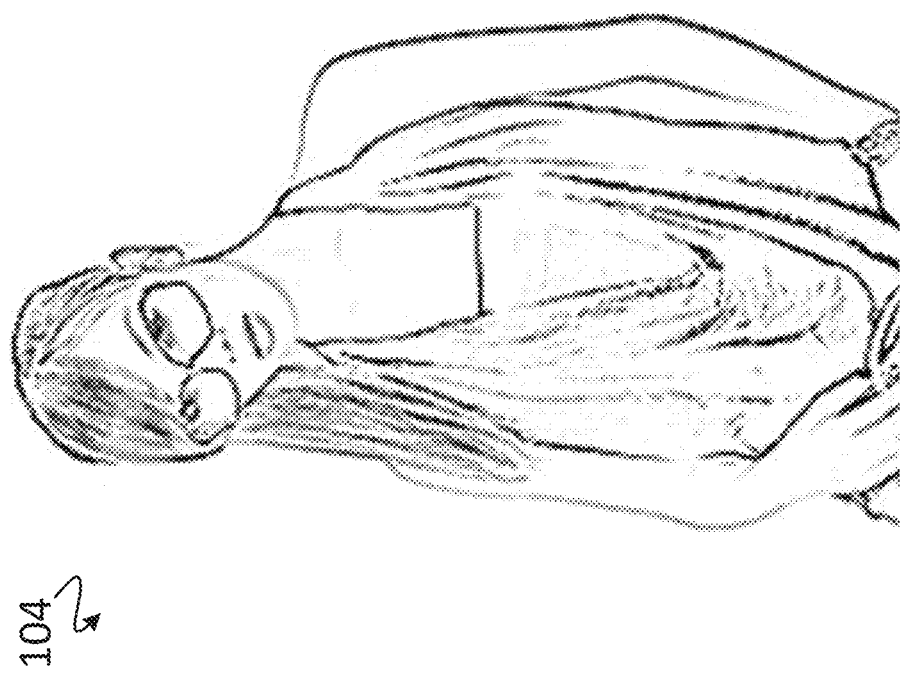
FIG. 1A shows a grayscale representation of a color image of a person which can be considered to be a separate frame of a video stream.

Embodiments disclosed herein involve methods and devices for highly efficiently compression and decompression of large volume video information ("VI") in a video encoder/decoder designed for reliable transmission/reception through communication channels with limited and time-varying bandwidth and/or recording in a memory device of limited volume.

It is possible to limit the subtle moments of the dynamics of scenic objects of interest to the viewer, or their valuable fragments to the viewer, and transmit the image of the dynamic scene in a video stream with a lower frame rate, and at reproducing the scene at the decoder output, it is possible "to restore" these dynamics "mathematically" (for example, extrapolating the dynamics of an object (and even a scene) based on frames already selected for transmission/storage or interpolation of "skipped" frames based on the use of selected transmitted/stored frames).

The exclusion of this ("applied") redundancy requires taking into account the preferences of the viewer, the specifics of the applied problem and, possibly, the final goal (maybe multiple) of its solution, and, therefore, knowledge of the set of criteria for the intellectual processing of images/video stream from the standpoint of an answer to the question, "what is valuable and what is superfluous?"

Processed images and videos with minimized (and even completely excluded) redundancy of one and/or another type are referred to herein as "sketches". Restoration of the video stream in the decoder by introducing "applied redundancy" excluded by the encoder into such sketches at the decoder output should correspond to the visual representation to the viewer when perceiving the restored video, and such introduction should be carried out using intelligent means of image/video stream restoration in which information about the application and the specifics of the scenes must be included during the training of such intelligent means.

This does not mean the "aesthetic factors and aesthetic criteria" of the restored video from the standpoint of visual art. But, they can be taken into account (albeit partially) if the viewer is interested in transforming images/videos in accordance with certain artistic settings, including face beautification (makeup) and fantasy (including color) design at an invariable "graphic" frame (sketch version) of the visualized scene and its dynamics in the restored video stream, in accordance with subjective visual preferences, etc.

Intelligent video processing in an encoder and in a decoder requires the preparation of appropriate training material (for (deep) machine learning) and the use of artificial intelligence (AI) for the task (in particular, on the basis of trained artificial neural networks (ANN)).

If in the encoder, AI solves the problem of highlighting/emphasizing what is more important for the viewer according to the set of criteria given by the user, and the encoder itself is tasked with transforming the full-color (or B/W grayscale) scene into a frame-by-frame sketch for reduction of "applied" and statistical redundancy in order to increase the value of CR and to additionally form training material and, possibly, "frame-hints" for the ANN in the decoder for more adequate display of the current scene, then the AI in the decoder solves more complex problems.

Such complex problems result because from an original video (color, or grayscale) that has been visually simplified to the level of graphics, sketch, "pencil sketch", for each frame of this video, it is necessary to restore a full color (or grayscale) image that best matches the original video as a whole (including visual representations and scene dynamics) for the viewer. This task is referred to herein as "restoration and colorization of the image/frame" or "restoration of grayscale for black and white image."

If necessary, it is possible to organize the transmission of frame-hints for the ANN, which is responsible for the transformation of graphic (sketch) images of scenes into color or grayscale scenes by transferring such frames to the receiving side (and not necessarily in real time) in order to "further train" the ANN in real time during its work to solve the assigned problem for a given scene.

Thus, it is proposed to increase the video compression efficiency according to the following scheme: convert the original color or grayscale video sequence with a constant frame rate into a sequence of sketch-frames (usually B/W ones, but color ones are also allowed) with a variable frame rate that adapts to the dynamics of objects in a scene in which (in frames) natural and applied redundancy is significantly reduced. This sequence of sketch-frames is encoded and transmitted in the form of data through a communication channel or recorded in memory device. When restoring in a decoder, the data stream is decoded in order to obtain a sequence of sketch-frames into which earlier reduced (excluded) redundancy is introduced by means of a trained AI (grayscale level, color, etc.) to present to the viewer (user) the restored video stream, the visual impression of which fully satisfies the viewer. Ideally, the restored video stream should be a copy of the original video or slightly, according to the viewer's opinion, differ from it.

Consider an example from the field of video conferencing (VCS), when a video stream from one of the participants in the VCS session is transmitted in real time via a communication channel (physical or virtual) to other participants in such a session, and the bandwidth of this channel varies in time and can drop to extremely low values that do not provide complete transmission of the video stream having been compressed by a conventional video codec.

For example, an original video stream with a bitrate R=12 Mbit/s is compressed to bitrate value R=300 Kbit/s, i.e., CR=40 times, and the current bandwidth of the channel C(t)

dropped to 200 Kbit/s, i.e., R>C(t), which does not allow recovering video on the receiver side without significant losses. If under these conditions the system does not transmit a color that requires 24 bits/pixel in RGB mode, and grayscale, i.e., convert each VI frame to sketch (graphic) form (like dash, pencil view) with costs of 1 bit/pixel and in addition to this, each B/W frame can be compressed on average 5-10 times (by methods presented in the JBIG2 standard), if not more during lossy compression, then at such lossy compressed graphics the compression ratio will increase. The transition to a lower frame rate of 3-5 times (instead of 25 or 30 frames/s go to 5 to 10 frames/s) when restoring normal frame rate in the decoder will additionally reduce the video stream bitrate by 3-5 times. Thus, the rejection of color and grayscale, the encoding of a graphic image, and the reduction in frame rate provides CR=24×5×3=360 times, i.e., R=12M/360=33,333 bit/s<200 Kbps. This results in an almost acceptable transmission of such a video stream on the specified channel due to almost an order of magnitude (9 times) more efficient coding with a corresponding decrease in quality at the output of the decoder.

At the same time, significant information resources remain that can be used to transmit "frame-hints" and other types of traffic (for example, audio/speech or service information). It is assumed that the video quality can be restored using an ANN trained for such an application to a level close to the standard transmission of a video stream compressed by a traditional codec, bearing in mind the visual impression of the viewer—participant of the videoconferencing session, and not an objective criterion like PSNR.

A second example relates to video surveillance, namely recording a video signal during a T=24 hours period from a video camera to a limited-capacity memory device. Let this video signal without processing also be characterized by the following parameters: bitrate of the original stream from the video camera 12 Mbit/s, and a frame rate of 30 fps. It is advisable to compress this video stream at least 300 times. This can conventionally only be achieved by reduction via "applied redundancy" above all. Acting as in the previous example, the system will provide a compression ratio of 360 times, i.e., the video stream bitrate will be 33,333 bps, which will give the information volume I=24×3600×33333=2,879,971,200 bits~2900 Mbit=362.5 MB for the time T. Using conventional video encoding would increase this amount and cost of storing compressed video by an order of magnitude. At the same time, there would remain a question of the quality of the video surveillance situation based on the decoding of video recorded in super-compressed form. The quality of restoration of the original video in this case depends on the training material, on the training of the ANN itself, the features of its structure as applied to this application and its operation. The specificity of preservation for a long time of the background and the scene itself facilitates the task of high-quality restoration of the video stream, recorded in the memory device, in color.

As disclosed herein, when restored by a video decoder, with the support of a trained neural network, the quality of transmitted or stored video information (VI) advantageously corresponds to a visual representation of scenes and objects of interest ("OI") to a viewer (consumer/user), and in some embodiments, corresponds to the viewer's additional requirements (for example, taking into account only a sketch version of a video but with showing OI).

Systems and methods disclosed herein advantageously minimize the bitrate (volume) of the encoded video stream transmitted through the communication network, and/or minimize the amount of memory in the data storage system to record this stream in the most compact form by frame-by-frame conversion of the original video stream into a sequence of sketch-frames. Such encoded video gives informationally limited, but sufficient from positions of different applications, presentation about the corresponding frames of the original stream, on the basis of which (i.e., sketch-frames thus obtained with possibly reduced frame rate) the original video stream with its initial frame rate is restored frame by frame with a sufficient degree of similarity using a neural network trained on an adequate video material.

To achieve this goal, it is proposed to take into account the following factors and their actions, taking into account machine learning (ML) and neural networks: include in the training material the original color video for various applications received from the source of the video after the preprocessing of this video (see below); include in the specified material, if necessary, a black and white grayscale video after converting the original color video into it (see below); enable a graphic video (sketch version of the video) formed from the original color or black and white grayscale video stream using a suitable sketch-filter (see below); include images of objects of interest (OI) from various angles in the training material; and train artificial neural networks (ANNs) based on the received and external training material for various applications, within which it is assumed to use a video codec.

For an encoder, in accordance with some embodiments, the following factors and their actions are taken into account: determine from a viewer's (users) side, taking into account the applied problem being solved, which objects of interest (OI), the images of which are stored in the OI Database (DB), in assumed scenes in their dynamic development are most important (for example, certain types of objects and/or human faces) and the need to detect them and possibly determine their approximate location and size in the frame; determine the presence of objects of interest (detect them with the support of a trained neural network or a ready-made solution from, for example, the OPENCV library) in the original video stream and, if necessary, determine their approximate size relative to the frame size in the current scene displayed in the video stream by a sequence of uncompressed frames; and determine the scene change in the original video stream (if this option is enabled by the viewer).

In some embodiments, it is possible to use the method of calculating a cross-correlation of rij adjacent frames in digital form (Digital Image Correlation (DIC) method, as is understood in the art) and comparing rij with threshold μ (if rij<μ, then there is no scene change, otherwise the scene is changed). In other embodiments, other methods for comparing adjacent frames may be used, in particular, matching images based on "characteristic features", as is understood in the art (for example, contours or characteristic points of a contour).

For the encoder, in accordance with some embodiments, the following factors and their actions are further taken into account: encode every first frame of the first scene (and in every new scene after the first scene, if the corresponding option is enabled) using the JPEG method or similar for the so-called "frame-hint" for the advanced neural network, that is part of the ANN engine, which restores and colorizes in a decoder received sketch-frames in the order of their sequence and the relationship of adjacent frames of the same scene (based on, for example, calculating their rij); present encoded frame-hints as a set of packets for transmission with controlled bitrate and delay to the receiving side (but not necessarily in real time), to form a color palette of the corresponding scene using a neural network to restore and colorize the video recovered from the encoded sketch video stream, which is transferred to the receiving side of a communication system or recorded in a memory device in the encoded sketch form; convert after preprocessing the original video stream a full-color image in the current frame into a black and white grayscale representation if necessary; convert the original color and/or grayscale image in the current frame in two or four level black and white image in the form of a sketch (in graphic, line drawing, "pencil" form); if there is no need to convert the sequence of frames into halftone images, which is determined by the user, then ensure that each color frame of the sequence is converted to a sketch form, bypassing its conversion to a grayscale image; record separately as training material three video streams for training the ANN, namely: the original color video stream, converted to B/W grayscale form of the video stream (if it is formed), converted to a graphic sketch-form video stream; if necessary, enter a beautification function (activated by the user) for faces as detectable OIs presented in the current video stream; determine the locations of these faces in the current scene, recognize facial features (face features: wrinkles, lip folds, deep scars, color spots, etc.) and exclude some of them in the graphic version of the sketch-video stream restored in the decoder; encode a sketch video stream in graphical form; at the same time, said areas of the OI can be encoded taking into account their greater number of gradations of brightness (for example, represented by two bits), and to encode the main stream, taking into account a smaller number of gradations of brightness (for example, when only one bit is allocated for each pixel); delay the encoding and transmission of each sketch-frame of the graphic stream for an acceptable time for the viewer (for example, 90 to 150 ms); use the current frame and the delayed one to interpolate intermediate frames between them and if the intermediate frames restored by interpolation differ from the actual graphic sketch-frames less than the selected threshold, then exclude from encoding and transmission all such real intermediate frames in view of their recovery on the receiving side with the required accuracy; adjust the frame rate of the graphic stream, determining the need for encoding a new sketch-frame and its subsequent transmission through the communication channel by determining the difference level of this frame with the last frame transmitted to the channel and comparing the difference level of the reconstructed frame and the real frame with the threshold indicated above; if the threshold is not exceeded, then the next sketch-frame is not encoded and not transmitted, and if it is exceeded, then the sketch-frame is encoded and transmitted to the communication channel; packetize the data at the output of the sketch encoder (operating, for example, in accordance with the JBIG/JBIG2 methods, taking into account information about different accuracy representations of frame fragments) and multiplex them together with packets of "frame-hints", scene change data, and location information and approximate sizes of OI and numbers of graphic frames selected for transmission, as well as, if necessary, with speech/audio packets (in the description below they are not considered); and the output data of the multiplexer should be transmitted via the communication channel or stored in memory.

For a decoder, in accordance with some embodiments, the following factors and their actions are taken into account: demultiplex the packet stream from the communication channel or from memory: encoded sketch stream 1 with frames in graphical form; separate control stream 2 by service information (scene change data, information about the detection of OI in the original video stream and data about their approximate location in the frame, data about different accuracy of presentation of fragments of sketch-frames concerning detected OIs, numbers selected for transmission of graphic frames, signal of control of beautification); separate stream 3 with frame-hints; depacketize each of the three pointed streams by sending each of them to the corresponding units; (in this case, the speech/audio stream is processed, decoded and reproduced and in this application it is not the object of formation, transmission and playback in synchronization mode in the video stream restored at the decoder output and is mentioned here only because of its traditional inclusion in the general multimedia stream); decode graphic sketch-frames transmitted to the channel, forming a sketch stream in graphic form with missing intermediate frames; restore in an interpolator, which is similar to the interpolator in the encoder, the input of which receives the transmitted graphic frames from the memory unit (with recording to it when activating the function beautification data about frame with face makeup or without activating this function) and information about their numbers, missing intermediate frames with the purpose of their subsequent inclusion in the restored graphic video stream and thereby making the restored sketch stream in graphic form uniformly continuous one with the original frame rate; activate the beautification function (according to the user's decision), for which purpose the beautified sketch stream is simultaneously fed to the memory device input and to the input of the unit for inclusion of sketch-frames missed and restored in the interpolator in order to form a stream with a constant frame rate; at deactivating of the beautification function, the stream of sketch-frames can be directly fed to the output of the decoder and reproduced in a graphic sketch form on the monitor; decode the encoded frame-hints in a JPEG decoder (or a similar decoder), counting each of them as the first color frame of a new scene and sending them to the unit of trained ANNs that are part of the ANN engine for their "further training/correction" for a specific scene for the purpose of restoration and colorization of the video stream with playback quality satisfying the viewer (the role of a frame-hint for an adjacent monochromatic sketch-frame can additionally be played by the already colorized (previously within this video sequence) sketch-frame); colorize the restored sketch stream in graphical form using a trained ANN engine, including a neural network for restoring and colorizing the sketch stream in graphical form (for example, a convolutional type neural network) and a neural network to take into account the color representation for each new scene in the restored video stream based on frame-hints (for example, using a generative adversarial networks (GAN) type with competition of two components (generator and discriminator) [I. Gitman. The use of competing networks for machine learning tasks. Moscow State University, 30 pp., 2016 (in Russian)]); if necessary, enter the aesthetic and artistic colorization of the required style in a color video stream, or a grayscale stream, or a graphic sketch stream, process the corresponding stream frame by frame, but taking into account the colorization of adjacent sketch-frames using a separate ANN specially trained for such colorization for the corresponding stream; and in the absence of such need, conduct post-processing of the sketch stream with a constant frame rate.

In accordance with some embodiments, several important elements make up the essence of the method of highly efficient compression of VI disclosed herein. These include the conversion of images (frames of a digitized video stream or digital images/photographs) into the form of sketches (e.g., imitations of pencil drawings). Such methods of conversion are known in the art. For example, the well-known packages ADOBE PHOTOSHOP ELEMENTS, COREL PAINTSHOP PRO, ZONER PHOTO STUDIO, and others include toolkits (filters and effects) that implement such transformations based on well-known image processing methods, as are known in the art and described in US patent publication No. 2005/0135480, published Jun. 23, 2005, Li, et al.

Figure 1B:
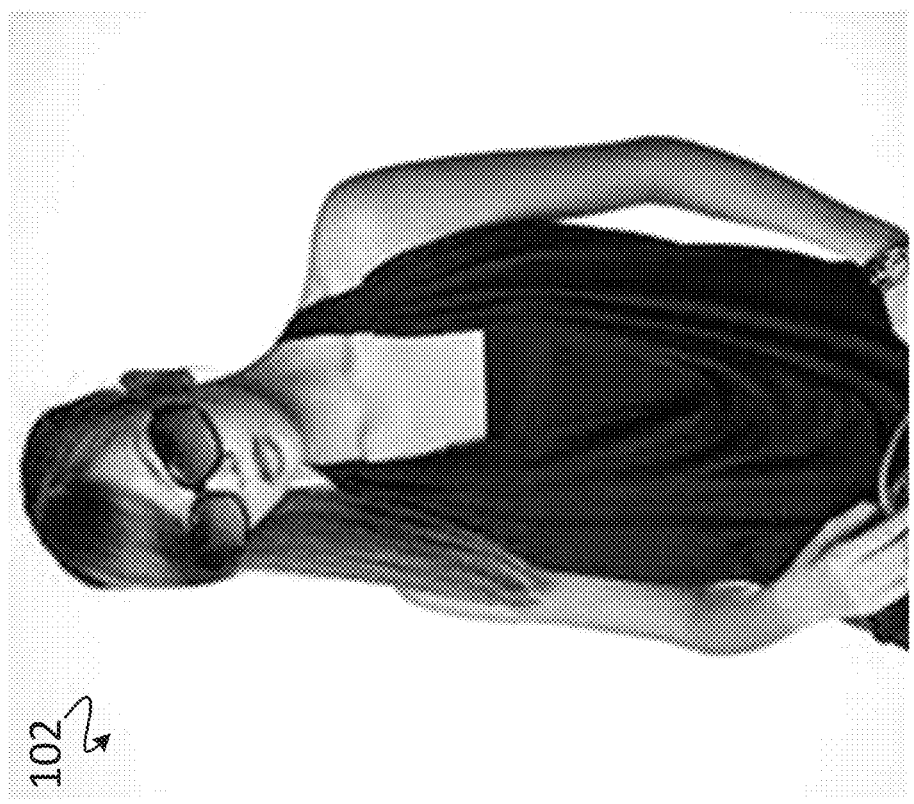
FIG. 1B shows a sketch-version of the image shown in FIG. 1A, in accordance with some embodiments.

As an example, FIG. 1A shows a B/W representation of a color photograph 102 of a human on a uniform background. FIG. 1B shows a sketch conversion 104 of the photograph 102 of FIG. 1A. A pencil-type sketch excludes other details in addition to color, but leaves (which is required without fail) the possibility of identifying a represented person or other object. Moreover, there is no specific (unambiguous) type of sketch without indicating its features, which is illustrated by photographs 202a-202d of figures FIG. 2A-FIG. 2D, respectively.

Thus, it is clear even to the uninitiated in the issues of processing and coding images that the information volume of a color/grayscale image and its sketch copies are very different. Note that the original color or B/W grayscale image and its sketch copy serve as training material for the ANN, which is part of the ANN engine, respectively, for the output of the neural network and its input.

To increase the degree of potential compression of graphic data in a sketch form, it is advisable to get by with a minimum number of lines, while maintaining all the same good opportunities for recognizing an object (in this case, the most difficult to recognize—a person's face) and, possibly, ignoring the general background, but not important objects in the scene.

Image coding (in particular, based on JPEG/JPEG-2000 standards or similar codecs) is widely represented in various sources, including standards in this area. Not described herein are the well-known methods of encoding and decoding graphics (in particular, archiving in lossless and lossy modes, as is understood in the art, and the JBIG and JBIG 2 standards), but an important aspect is noted: the colorization of B/W graphics in sketch format.

Colorization is widely used to convert B/W grayscale images (e.g., old photos and B/W films) to color images. "Color tips" (hints) for individual fragments of the image also play a positive role in this. But from the standpoint of embodiments disclosed herein, the case of converting a sketch into a color image using neural networks is more interesting. Reviews on this topic can be found in the article "*Pix2pix neural network realistically colors pencil sketches and black and white photos*", Nov. 22, 2016, Retrieved from the internet: <URL: https://habr.com/en/post/399469/>.

The issue of detecting OIs (in particular, faces) and determining their boundaries has been solved quite reliably based on the Viola-Jones CV method included in the OPENCV package, as is understood in the art. But due to the wider use of neural networks, this package supports such deep learning frameworks as TENSORFLOW, TORCH/PYTORCH and CAFFE. It also includes an advanced method for detecting OI (including faces) based on trained ANNs, which, however, requires more computing resources.

Mathematical methods of extrapolation and interpolation of images are widely used, as is known in the art. In the US patent publication No. 2006/0215014, published Sep. 28, 2006, Cohen et al., this approach is used primarily. In embodiments disclosed herein, interpolation of intermediate sketch-frames based on the current frames i and delayed frames i–n in the memory device by n frame intervals is used to thin out frames that are characterized by a small dynamics in the scene, i.e., reduce frame rate if they are restored with a controlled error and are consistent with the dynamics of objects in the scene.

If during interpolation it turns out that the interpolation error exceeds the threshold, then the i and i–n+1 frames are interpolated, and the interpolation error is controlled. This process will stop at the i–n+j frame if the indicated error is less than the threshold, i.e., sketch-frames with numbers i–1, . . . , i–n+j can be restored with controlled accuracy and it is not need to transmit them to the receiving side, but service information about the numbers of skipped sketch-frames (or the numbers of remaining frames) must be transmitted to the receiving side. The interpolator should work both on the side of the encoder, in which the question is solved as to which sketch-frames can be skipped and thereby reduce the frame rate without losing the dynamics of objects in the dynamic scene, and on the side of the decoder, in which interpolation allows to restore the sketch-frames missed in the encoder with controlled error and thereby restore the original frame rate.

Since the main intellectual processing of the sketch video in the decoder is performed by the ANN, which restores and colorizes the video stream, in addition to the independent training material for machine learning (MML) of the neural network independent of the ANN complex (or ANN engine), it is supposed to prepare its own training material obtained from the color video stream, its converting to a black-and-white (B/W) grayscale video stream and then converting the original video stream to a sketch form, where each frame is considered as a stand-alone image, characterized by its own i-th number.

Sketch-frames, as well as the corresponding color or B/W grayscale frames of the indicated video sequences serve as training material for the ANN: sketch-frames as inputs, color or B/W as the outputs of the ANN. (Note that it is advisable to use B/W tonal video if the described VI compression method is also used for encoding B/W tonal video as well).

In the process of the decoder and the ANN engine operation, which may include a multilayer convolutional network, and/or a recurrent network, and/or their mixture, and additionally a generative-adversarial network, the mode of retraining of neural networks is supported. Further training is actually connected with the transmission with some possible delay of the first color frame-hint of the first scene after its encoding on the transmitting side (for example, JPEG encoder) and decoding on the receiving side (for example, by JPEG decoder), if the scene practically does not change (small dynamics the objects present in its framework that are not taken into account), or the first frame of each new scene within one video stream. When retraining, these frame-hints are given high priority, which can change the weights of neurons in all layers. In this case, the normal operation of the ANN is interrupted, and it enters the after-training mode, in which the training material is only a frame-hint for the processed video stream. If the video stream contains several scenes, then a set of frame-hints for each new scene is used, and the process of retraining in this case is provided when detecting a scene change.

Extra-trained ANNs are used as the main mechanisms that implement the process of restoring and colorizing sketch-frames of a video stream. At the same time, the process of training ANNs occurs almost autonomously from the process of transmitting/recording a video stream. The training material must correspond to the specifics of the video application (for example, the specifics of video surveillance) "in the preset mode", and the training material collected and recorded in the database can "retrain" the ANN already "in its fine-tuning mode", but again during the offline mode "Training ANN." However, single frame-hints provide "additional training" for a specific current scene during the operation and interruption of this ANN operation. The same role is played by already colorized sketch-frames for their adjacent still monochromatic sketch-frames to ensure consistency of their coloring.

Based on the above, the following factors and mechanisms are indicated which contribute to improving the quality of video playback at the decoder output by adapting the encoder and decoder to the specifics of the application, but mainly to the specifics of the scene and its dynamics, which are expressed in the following:

A first factor involves taking into account the specifics of each new scene based on sending frame-hints to the receiving side for further training of the ANN (in some embodiments the first frame of each new scene is sent, but any suitable frame from the scene can be selected if the real time scale for the video stream is not provided, which occurs during recording in memory device).

A second factor involves analysis of video in the encoder for a scene change.

A third factor involves additional training of ANN for each scene, i.e., restoration and colorization of the frame based on the ANN should be consistent with the current scene.

A fourth factor involves accounting for the restoration and colorizing (or repainting) of still monochromatic sketch-frames based on already colorized adjacent sketch-frames to match them under the assumption of their strong correlation, which involves the use for colorization of a colorized frame as the basis for coloring an adjacent, but still monochromatic frame.

A fifth factor involves accounting for the dynamics in the scene: if the dynamics are small in relation to the frame rate, i.e., the frame rate is excessive for its display, which is determined in the encoder by the interpolation accuracy of the intermediate sketch-frames, then these frames are excluded during transmission and they are restored in the decoder by interpolation, i.e., variable frame rate of the transmitted sketch-video depends on the dynamics in the scene. This mechanism replaces motion estimation in traditional video codecs.

Figure 3A:
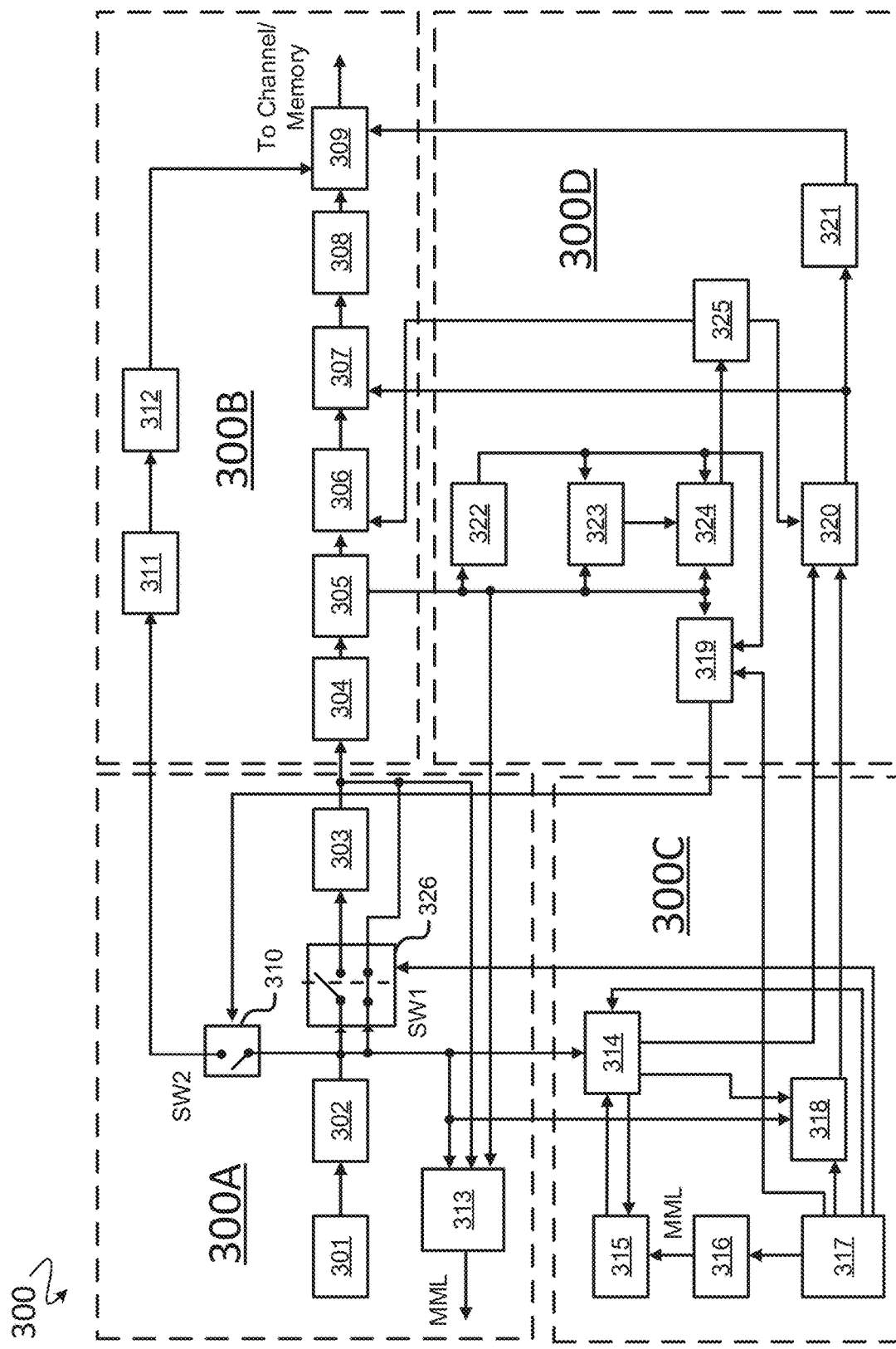
FIG. 3A shows a high-level flowchart of a video encoder, in accordance with some embodiments.
Figure 3B:
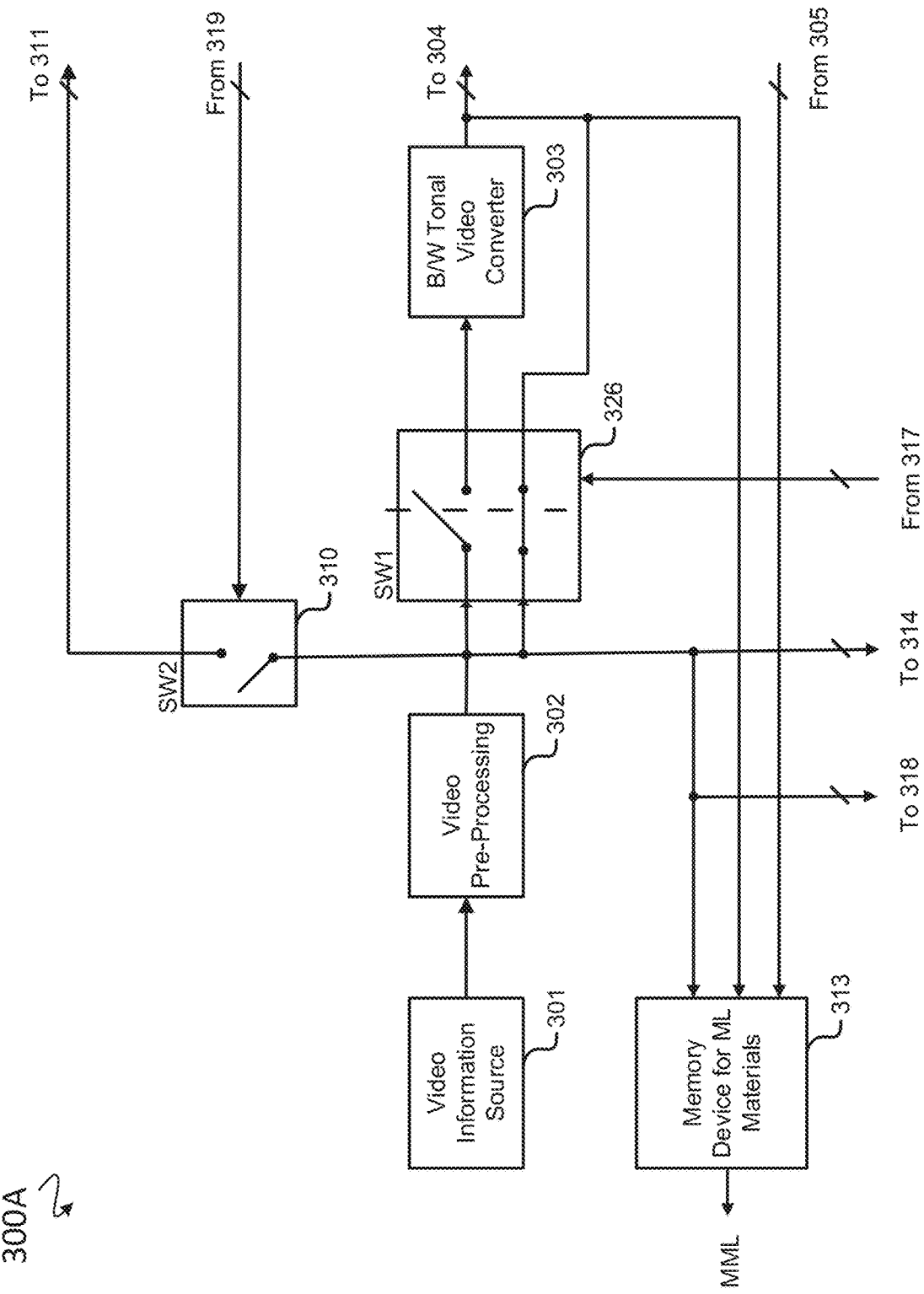
FIGS. 3B-3E show details of the video encoder flowchart shown in FIG. 3A, in accordance with some embodiments.
Figure 3C:
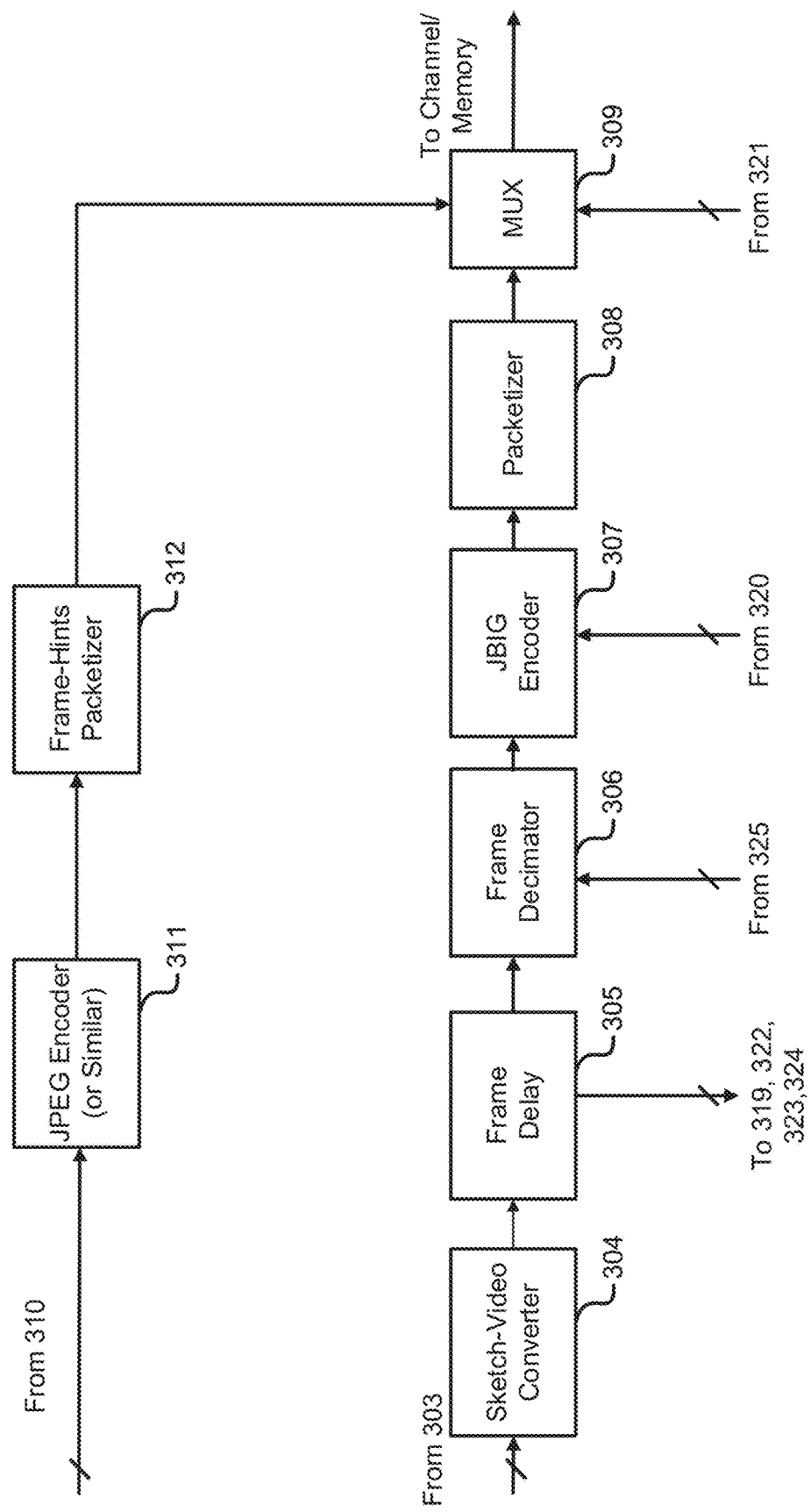
Figure 3D:
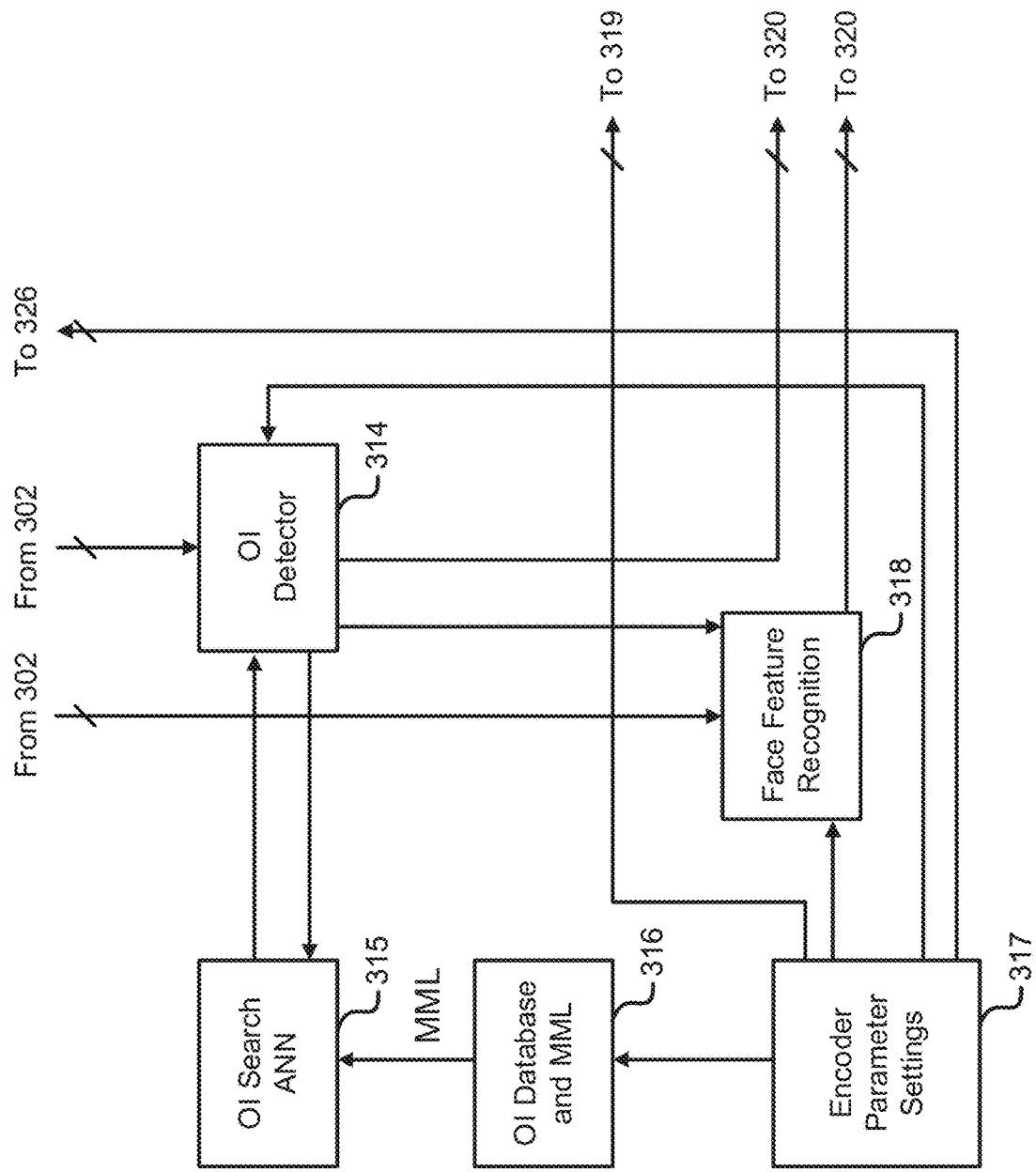
Figure 3E:
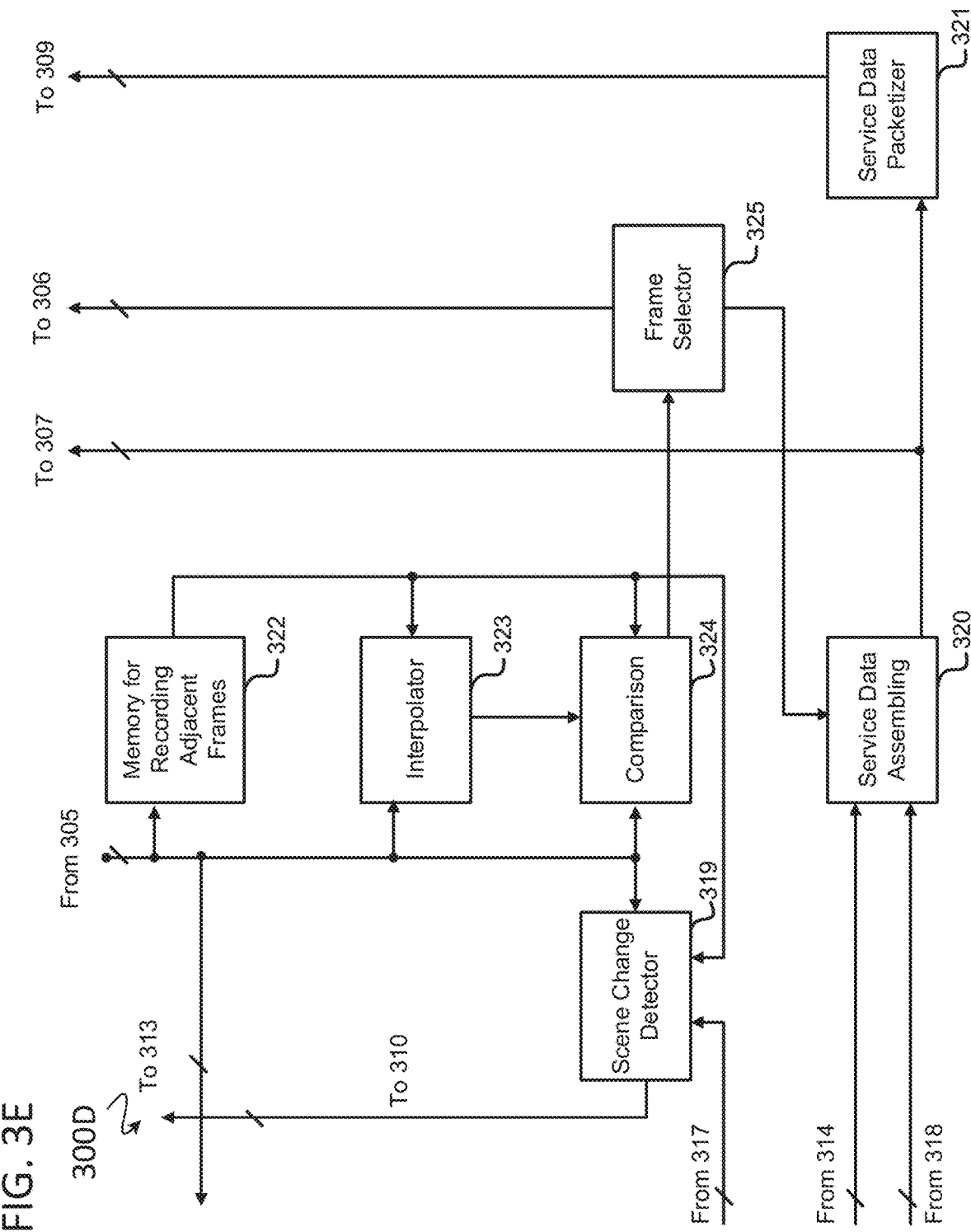
Figure 4A:
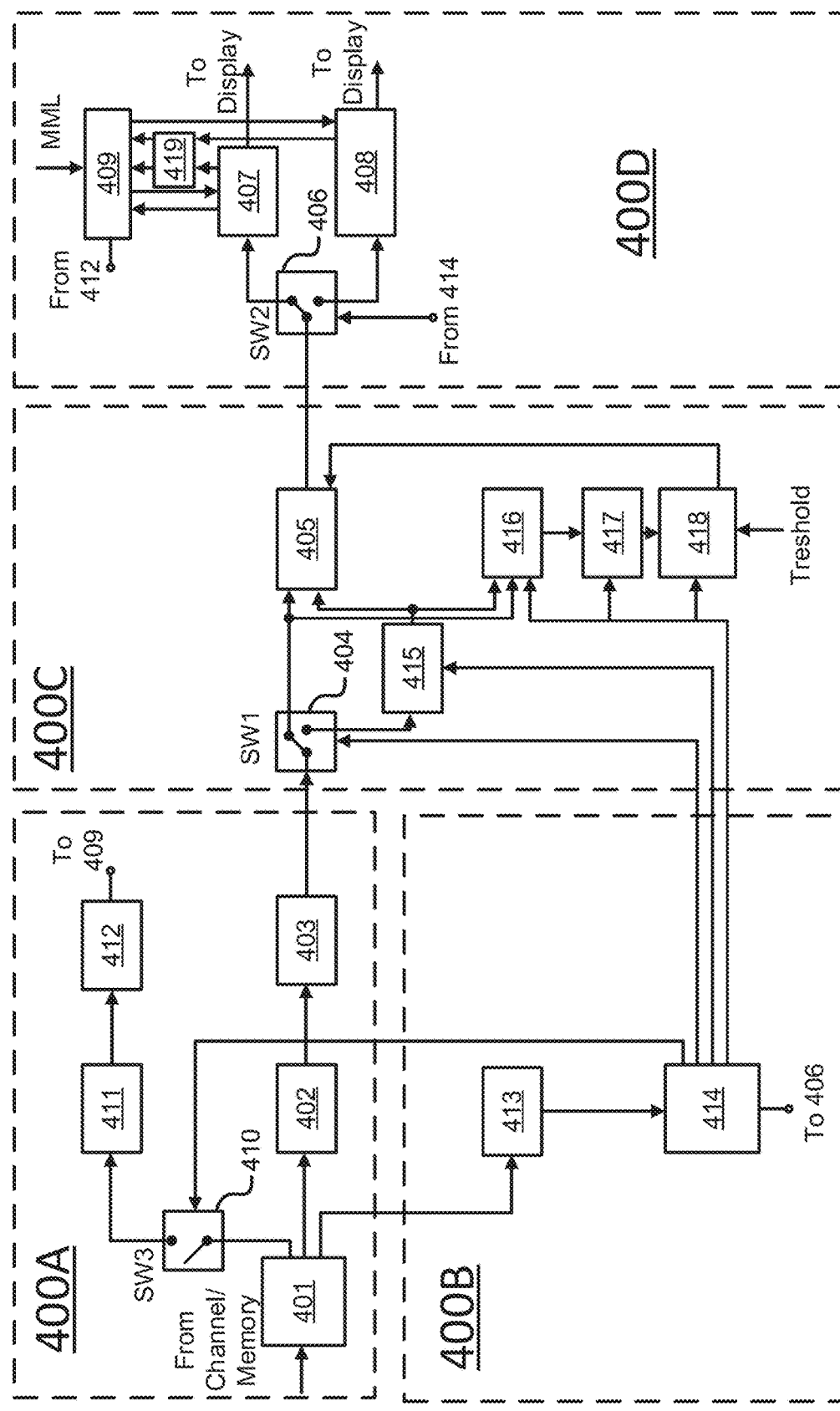
FIG. 4A shows a high-level flowchart of a video decoder, in accordance with some embodiments.

High level flowcharts of an encoder 300 and a decoder 400 of the video compression device for subsequent transmission over communication channels with relatively low and/or varying bandwidth or for storage in data storage systems are shown in FIG. 3A and FIG. 4A, respectively, in accordance with some embodiments. Details 300A, 300B, 300C, and 300D of the encoder 300 of FIG. 3A are shown and described with respect to FIG. 3B through FIG. 3E, respectively. Similarly, details 400A, 400B, 400C, and 400D of the decoder 400 shown in FIG. 4A are shown and described with respect to FIG. 4B-FIG. 4E, respectively.

The encoder 300 receives a video signal from a video information source unit 301 (FIG. 3B) in the form of a video sequence represented by a set of frames following with a uniform frame rate FR fps (frame/s). The video signal is then pre-processed by video pre-processing unit 302 (FIG. 3B) (for example, to suppress noise) and from its output it goes to a switch SW1 unit 326 (FIG. 3B), which can dispatch a pre-processed video stream to B/W tonal video converter unit 303 (FIG. 3B) by the control signal transferred to the switch SW1 unit 326 (FIG. 3B) (it implements the conversion of color video to B/W grayscale video, used mainly as training material for a neural network) or directly to sketch-video converter unit 304 (FIG. 3C), which performs the function of converting frames of a color (or B/W grayscale) stream into a sketch form. The sketch-video converter unit 304 (FIG. 3C) is the main unit in the encoder 300; it determines the specifics of the sketch-video and encoder characteristics and implements the corresponding sketch filter. The output stream of the sketch-video converter unit 304 (FIG. 3C) enters frame delay unit 305 (FIG. 3C) for frame delay, during which the analysis of the dynamics in the scene and frame rate is performed.

Adaptation of the current frame rate of the sketch stream to the dynamics of objects in the scene is performed in frame decimator unit 306 (FIG. 3C), the task of which is to exclude from the encoding and transfer to the receiving end those sketch-frames that can be quite accurately restored in the decoder by interpolating the missing sketch-frames from adjacent transmitted sketch-frames. The latter come from the frame decimator unit 306 (FIG. 3C) for encoding to JBIG encoder unit 307 (FIG. 3C) of the sketch encoder, which, taking into account a control signal at its control input, can use lossless encoding of the binary stream (for example, based on the JBIG/JBIG2 entropy encoder) or lossy encoding of sketch-frames stream in accordance with JBIG2 encoder). The encoded sketch stream is sent to packetizer unit 308 (FIG. 3C) for packetization and then to multiplexer (MUX) unit 309 (FIG. 3C) for multiplexing with frame-hints in batch form and service data in batch form.

The frame-hints for further training the neural network in the decoder for the current scene are the first frames of each new scene in the video stream. These frames, before being transmitted to the receiving end, are received from the output of the video pre-processing unit 302 (FIG. 3B) via switch SW2 unit 310 (FIG. 3B) in the presence of an enabling control signal to its controllable input to the input of a JPEG encoder (or similar lossy encoder) unit 311 (FIG. 3C), where they are encoded with controlled losses in image quality. The coded frame-hint is packetized at frame-hints packetizer unit 312 (FIG. 3C). The packet streams from the packetizer unit 308 (FIG. 3C) and the frame-hints packetizer unit 312 (FIG. 3C) are multiplexed by the MUX unit 309 (FIG. 3C).

The original color video stream, B/W grayscale video stream, if it is formed, and the sketch stream are recorded to the memory device (for ML materials) unit 313 (FIG. 3B) for subsequent possible use as training material ("MML") in a specific application area for the neural network, which will be used for similar video encoding tasks when it is transmitted, it can be used directly for training the neural network, which is part of the ANN engine in the decoder, if it is supposed to store this video stream in compressed form to store in the storage system, and then play it upon request.

The original stream from the output of the video pre-processing unit 302 (FIG. 3B) simultaneously enters the object of interest (OI) detector unit 314 (FIG. 3D), the operation of which is based on the use of a specially trained OI search ANN unit 315 (FIG. 3D) and two-way interaction with it, and its training is based on training material (e.g., MML) previously recorded in an OI database and MML unit 316 (FIG. 3D) unit storing OI records of various types. Control information about the selection of specific OIs from the list of Objects of Interest and their descriptions (usually in the form of images) is supplied from the encoder parameter settings unit 317 (FIG. 3D), in which the settings are made by the user. In operation, the OI detector unit 314 (FIG. 3D) is also turned on by a signal from a user through the encoder parameter settings unit 317 (FIG. 3D).

In addition to the instructions about the OI, the user can use the encoder parameter settings unit 317 (FIG. 3D) to control the switch SW1 unit 326 (FIG. 3B), set the start of the face feature recognition unit 318 (FIG. 3D), which, when indicating that the OI is a person's face and must be beautified (for example, to eliminate wrinkles and scars on this face in the frame) and from the OI detector unit 314 (FIG. 3D) the corresponding information about the face is received, from the encoder parameter settings unit 317 (FIG. 3D) the control signal "recognize the features of this face" (face features: nose, mouth, eyes, labial folds, wrinkles, scars, etc.) is received. The operation of the face feature recognition unit 318 (FIG. 3D) is based on computer vision (CV) methods, which are presented in the open and large library of CV functions in the OPENCV package.

Thus, through the encoder parameter settings unit 317 (FIG. 3D), the user can give the setting "detect OI" (in particular, a face), determine its boundaries, i.e., determine the location of the face and its approximate size, set the beautification of some facial features in the face feature recognition unit 318 (FIG. 3D), give a signal to convert the color video stream to B/W grayscale and a signal to start a scene change detector unit 319 (FIG. 3E), determine the type of encoder in the JBIG encoder unit 307 (FIG. 3C), collect all these service data, including information from the scene change detector unit 319 (FIG. 3E), which generates the number of the first frame in the new scene, and from the OI detector unit 314 (FIG. 3D) (OI detection, its approximate location and size), in a service data assembling unit 320 (FIG. 3E), information about which is supplied to the service data packetizer unit 321 (FIG. 3E), and transmitted in packet form to the MUX unit 309 (FIG. 3C) for multiplexing.

To solve the problem of adjusting the frame rate in the frame decimator unit 306 (FIG. 3C), a memory device unit 322 (FIG. 3E) is used to record several consecutive sketch-frames, which receive a sketch stream from the output of the frame delay unit 305 (FIG. 3C), and simultaneously sketch-frames from the output of the frame delay unit 305 (FIG. 3C) are fed to an interpolator unit 323 (FIG. 3E), a comparison unit 324 (FIG. 3E) for comparing the current frame with an interpolated image of adjacent frames and output from the scene change detector unit 319 (FIG. 3E). The output of the memory device unit 322 (FIG. 3E) is fed to the second input of the interpolator and the second input of the comparison unit 324 (FIG. 3E), the output of which is connected to the input of the frame selector unit 325 (FIG. 3E). The signal of the latter is supplied to the frame decimator unit 306 (FIG. 3C), which implements the function of thinning the sketch stream.

Figure 4B:
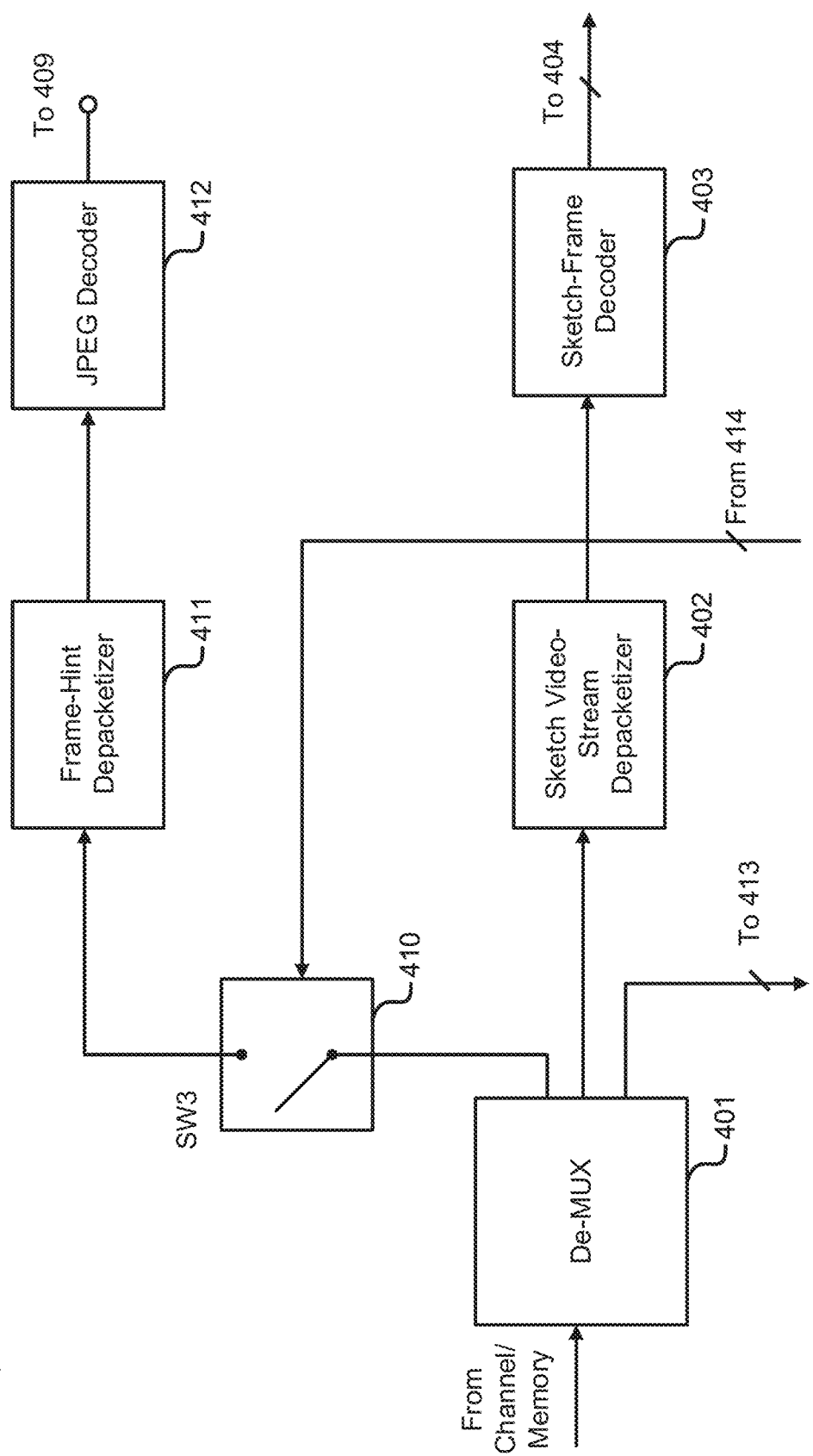
FIGS. 4B-4E show details of the video decoder shown in FIG. 4A, in accordance with some embodiments.
Figure 4C:
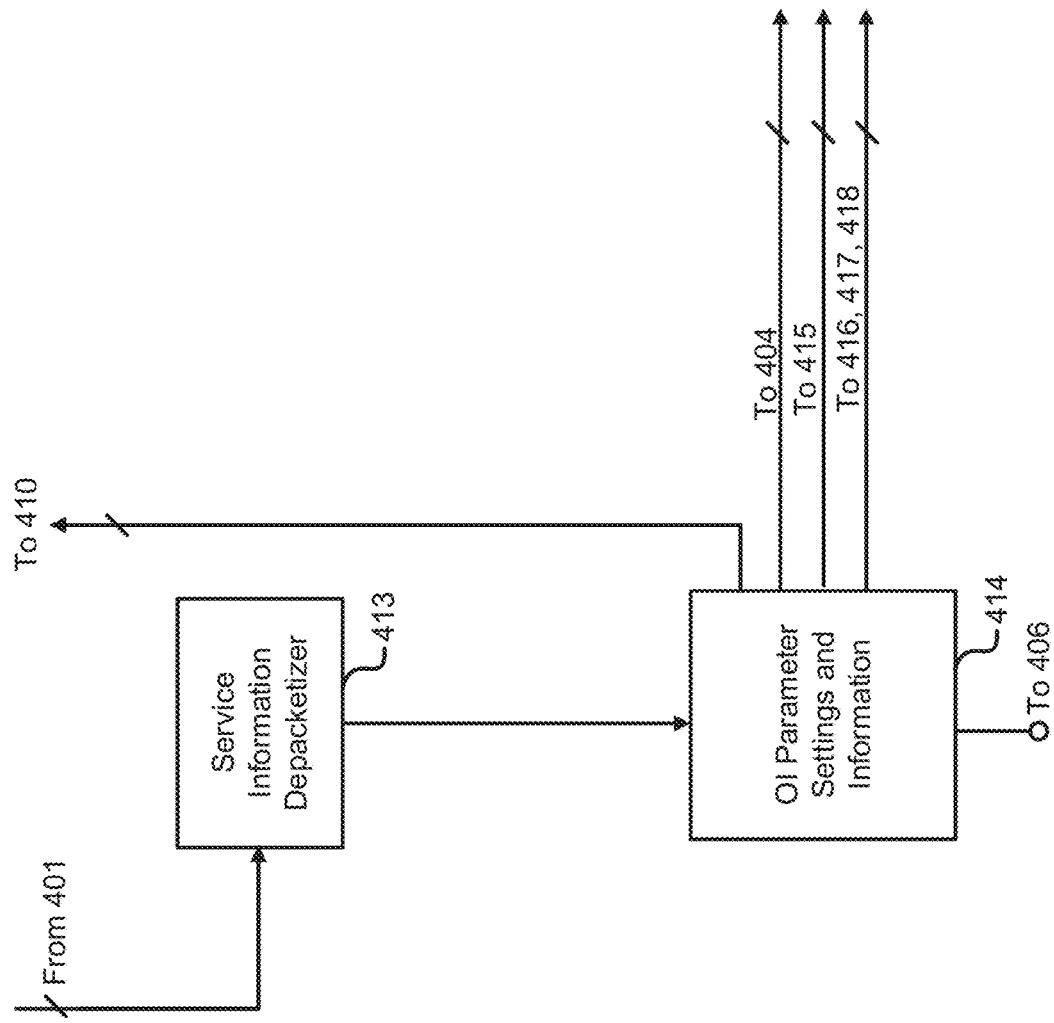

Attention is now turned to FIG. 4A, which provides high-level details of the decoder 400. Details 400A, 400B, 400C, and 400D of the decoder 400 shown in FIG. 4A are shown and described with respect to FIG. 4B-FIG. 4E, respectively. The decoder 400 converts the encoded sketch-video signal to a restored and colorized video stream. A packet stream arrives at the decoder 400 input from a communication channel or from a memory device ("MU") to demultiplexing ("De-MUX") unit 401 (FIG. 4B). The demultiplexing unit 401 (FIG. 4B) directs the first (main) stream of sketch packets to the sketch video-stream depacketizer unit 402 (FIG. 4B) of the decoder 400, but at the same time sends the second stream through switch SW3 unit 410 (FIG. 4B) to a frame-hint depacketizer unit 411 (FIG. 4B) of frame-hints, and the third stream of service information packets are sent to the service information depacketizer unit 413 (FIG. 4C).

Figure 4D:
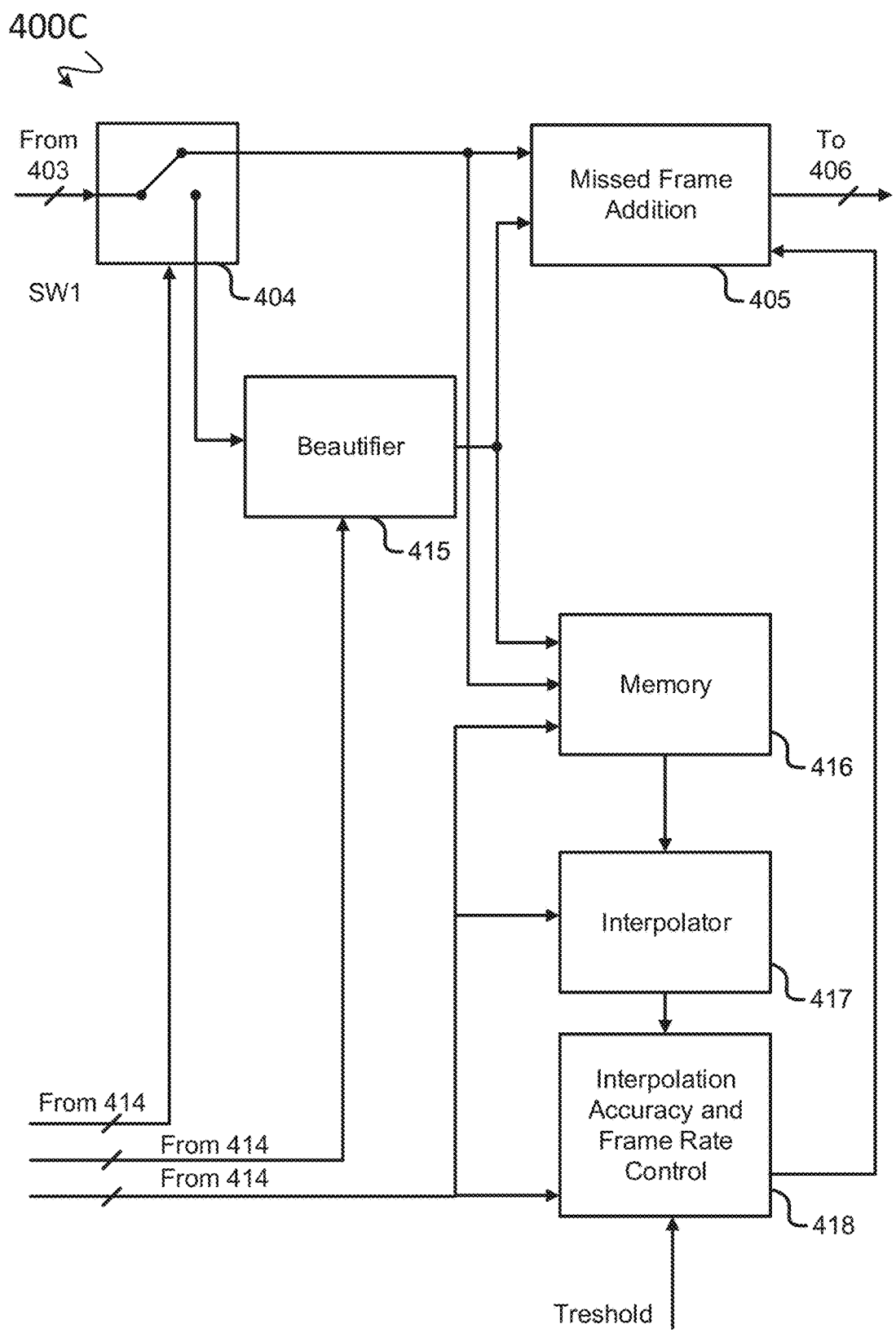

After depacketization, the main stream enters a sketch-frame decoder (e.g., JBIG/JBIG2) unit 403 (FIG. 4B). The stream of sketch-frames decoded by the sketch-frame decoder unit 403 (FIG. 4B) with an uneven frame rate through switch SW1 unit 404 (FIG. 4D) enters (in the absence of a signal for activating the beautification function from the user side) to the missed frame addition unit 405 (FIG. 4D) for adding skipped frames, which are restored by interpolation in the decoder 400 according to the scheme implemented in the encoder 300; memory device ("MU") unit 416 (FIG. 4D), interpolator unit 417 (FIG. 4D), interpolation accuracy and frame rate control unit 418 (FIG. 4D) for control the accuracy of interpolation and control the bitrate of the sketch stream, which receives the restored frames from the interpolator and transfers them to the missed frame addition unit 405 (FIG. 4D). At activation, a beautification function, which is realized by the beautifier unit 415 (FIG. 4D), control signal is transmitted to the beautifier unit 415 (FIG. 4D) from a OI parameter settings and information unit 414 (FIG. 4C) of the decoder; at this control signal and information about the selected facial features and their location on the faces in the frame, the beautification of the OI (faces) is performed and the stream of sketch-frames after the beautification is received at the second input of the missed frame addition unit 405 (FIG. 4D). In this case, the switch SW1 unit 404 (FIG. 4D) is set by the signal from the OI parameter settings and information unit 414 (FIG. 4C) to the "lower position" (beautification permit).

Figure 4E:
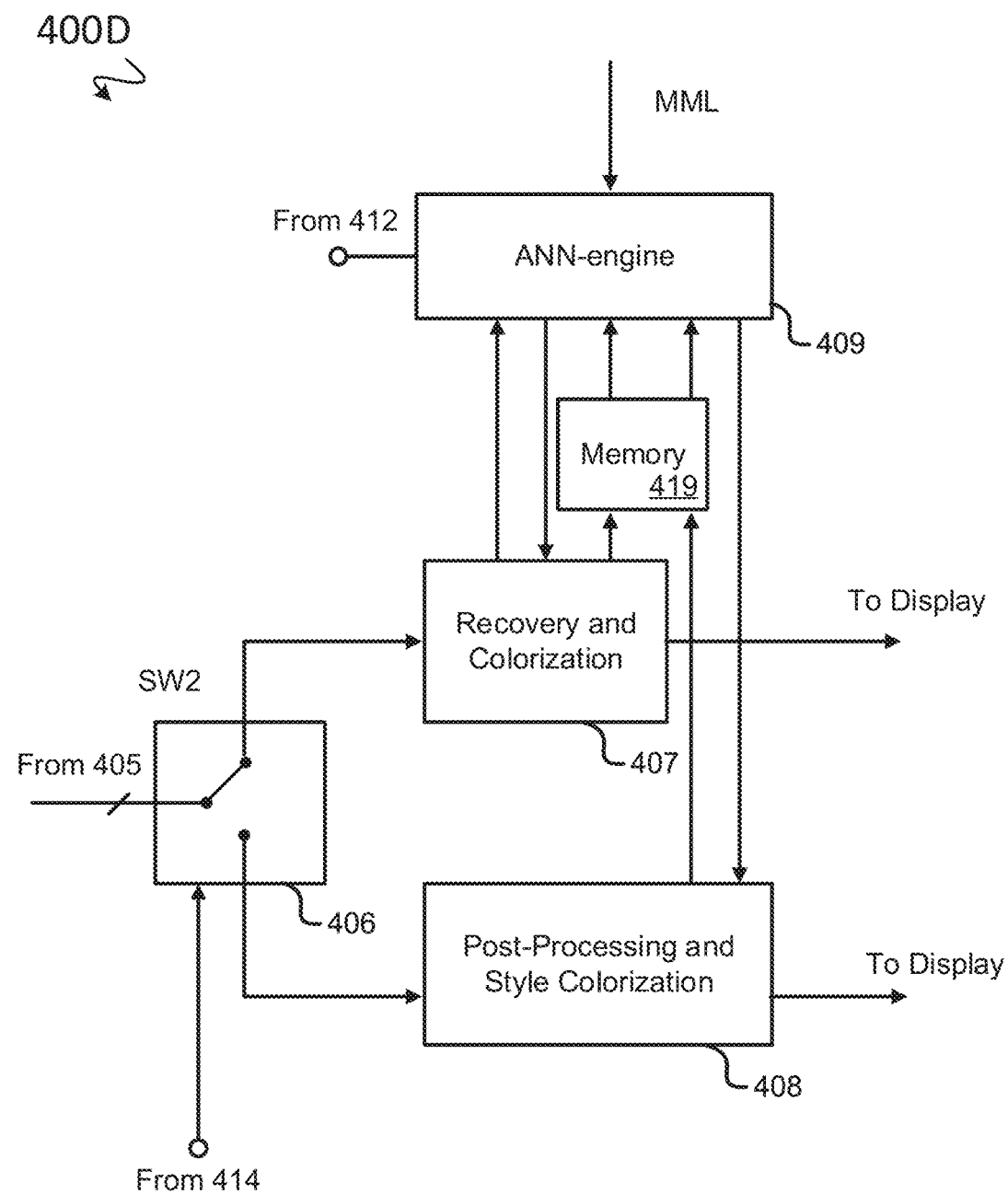

Thus, the missed frame addition unit 405 (FIG. 4D) generates at its output either an unbeautified or beautified stream of sketch-frames at a constant frame rate, which are then transferred through switch SW2 unit 406 (FIG. 4E) to a recovery and colorization unit 407 (FIG. 4E) of this video stream using a trained complex ANN (ANN engine), represented by ANN-engine unit 409 (FIG. 4E). Additional training for a specific scene of the trained ANN is performed by a frame-hint decoded in a JPEG decoder unit 412 (FIG. 4B), to which this frame is supplied from the frame-hint depacketizer unit 411 (FIG. 4B).

A complex ANN (or ANN engine) can include, for example, a convolutional neural network (CNN) and a generative adversarial neural network (GAN), which work together to implement the process of restoring and colorizing a sequence of sketch-frames. This complex ANN is trained at a time when the decoder is not functioning, based on material for deep machine learning (MML), and its further training for a specific scene occurs during decoder operation by receiving and processing frame-hints from the JPEG decoder unit 412 (FIG. 4B) and/or during colorization adjacent sketch-frames, when the sketch-frame already colorized in the recovery and colorization unit 407 (FIG. 4E) is recorded in memory device unit 419 (FIG. 4E) and this record is already sent to the ANN engine to "retrain" the ANN, which restores and colorizes (more precisely: re-colorizes the adjacent sketch-frame if the basis of its colorization is the previous colorized frame, which suggests their "similarity").

As noted above, the restoration of the original frame structure of the video stream with a constant frame rate occurs in the missed frame addition unit 405 (FIG. 4D), the frames restored by the interpolator unit 417 (FIG. 4D) being received at the third input of the missed frame addition unit 405. To do this, from the switch SW1 unit 404 (FIG. 4D), the flow of sketch-frames directly (to the first input of the memory device unit 416 (FIG. 4D)) or after their beautification (to the second input of the memory device unit 416

(FIG. 4D)) is supplied to memory device unit 416 (FIG. 4D), the units of frames are read by the interpolator unit 417 (FIG. 4D), and the first frame in this unit and the latter serve to interpolate the missing sketch-frames, and service data on their numbers comes from the OI parameter settings and information unit 414 (FIG. 4C) to units 416, 417 and 418 (FIG. 4D). From the interpolator unit 417 (FIG. 4D), the restored frames after verification (comparison with a threshold) in the interpolation accuracy and frame rate control unit 418 (FIG. 4D) are sent to the missed frame addition unit 405 (FIG. 4D). Frames received by the interpolator unit 417 (FIG. 4D) which did not pass the comparison may be marked as "defective".

The state of all the switches is set based on the service data from the OI parameter settings and information unit 414 (FIG. 4C). At the same time, the switch SW3 unit 410 (FIG. 4B) skips the first frame of the scene, which is determined by the service data processed in the OI parameter settings and information unit 414 (FIG. 4C); the switch SW1 unit 404 (FIG. 4D) sets the subsequent restoration of the unbeautified or beautified stream of sketch-frames; the switch SW2 unit 406 (FIG. 4E) sets the output to the display device (screen, monitor) for the viewer of the restored and colorized stream produced by the recovery and colorization unit 407 (FIG. 4E), or post-processing and outputting the sketch stream produced by a post-processing and style colorization unit 408 (FIG. 4E). The post-processing and style colorization unit 408 (FIG. 4E) can perform special stylistic and artistic processing of the sketch stream, provided that the integrated ANN is trained specifically for this mode of processing the sketch stream and style colorization. In this case, the mode of retraining the ANN in the ANN-engine unit 409 (FIG. 4E), as well as the restoration, styling, and colorization of adjacent frames in the post-processing and style colorization unit 408 (FIG. 4E), are performed in a manner similar to the restoration and colorizing of adjacent frames in the recovery and colorization unit 407 (FIG. 4E) with the support of ANN from the ANN-engine unit 409 (FIG. 4E).

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method, comprising:
   receiving a color video signal, the color video signal having a first frame rate;
   pre-processing the color video signal to produce a pre-processed color video stream;
   transforming the pre-processed color video stream into a sketch stream, the sketch stream being monochromatic;
   adapting the first frame rate of the sketch stream to a second frame rate in accordance with dynamics of objects in a scene;
   encoding the sketch stream to produce an encoded sketch stream;
   producing frame-hints using the pre-processed color video stream;
   encoding the frame-hints to produce encoded frame-hints;
   multiplexing the encoded sketch stream with the encoded frame-hints and service data to produce multiplexer output data; and
   transmitting the multiplexer output data via a communication channel or storing the multiplexer output data in a data storage system.

2. The method of claim 1, further comprising:
   detecting objects of interest in the pre-processed color video stream; and
   adding information about the detected objects of interest into the service data.

3. The method of claim 1, further comprising:
   encoding a first color frame from the pre-processed color video stream to produce a first frame-hint of the frame-hints, the first frame-hint comprising color.

4. The method of claim 3, further comprising:
   encoding a second frame from the pre-processed color video stream to produce a second frame-hint of the frame-hints, the second frame-hint comprising color, the second frame being encoded upon determining that a first scene depicted by the pre-processed color video stream has changed.

5. The method of claim 1, wherein:
   transforming the pre-processed video stream into the sketch stream comprises converting the pre-processed color video stream into black-and-white grayscale video.

6. The method of claim 5, wherein:
   transforming the pre-processed color video stream into the sketch stream further comprises minimizing redundancy of the black-and-white grayscale video.

7. The method of claim 1, further comprising:
   producing black-and-white grayscale video based on the pre-processed color video stream;
   producing artificial neural network training materials based on the pre-processed color video stream and the black-and-white grayscale video; and
   adding the artificial neural network training materials to the service data.

8. The method of claim 1, further comprising:
   receiving the pre-processed color video stream and sketch stream for training the artificial neural network;
   receiving, at the artificial neural network, a plurality of objects of interest records for training the artificial neural network; and
   detecting, using the trained artificial neural network, objects of interest in the pre-processed color video stream based on the plurality of objects of interest records.

9. The method of claim 1, wherein:
   the first frame rate of the sketch stream is adapted to the second frame rate based on a determination of scene dynamics of objects of interest of a first scene of the pre-processed color video stream.

10. The method of claim 2, wherein:
detecting objects of interest in the pre-processed color video stream comprises detecting locations of human faces in a current scene of the pre-processed color video stream.

11. The method of claim 1, further comprising:
demultiplexing the multiplexer output data to retrieve the encoded sketch stream, the encoded frame-hints, and the service data;
decoding the encoded frame-hints to produce the frame-hints;
decoding the encoded sketch stream to produce a decoded sketch stream;
producing an interpolated sketch stream using the decoded sketch stream and the service data, a frame rate of the interpolated sketch stream being equal to the first frame rate; and
producing, using an artificial neural network, a first scene of a restored video stream using the interpolated sketch stream and a first frame-hint from the frame-hints, the first scene of the restored video stream comprising color.

12. The method of claim 11, wherein:
the encoded frame-hints further comprise a second frame-hint, the second frame-hint being a second encoded frame of the pre-processed color video stream corresponding to a second scene depicted by the pre-processed color video stream.

13. The method of claim 12, further comprising:
producing a second scene of the restored video stream using the interpolated sketch stream and the second frame-hint.

14. The method of claim 11, further comprising:
receiving the first frame-hint at the artificial neural network;
receiving the interpolated sketch stream at the artificial neural network; and
producing the first scene of the restored video stream using the artificial neural network based on the interpolated sketch stream and the first frame-hint.

15. The method of claim 14, further comprising:
identifying artificial neural network training materials in the service data;
training the artificial neural network using the identified artificial neural network training materials; and
producing the first scene of the restored video stream using the trained artificial neural network based on the interpolated sketch stream, and the first frame-hint.

16. A method, comprising:
receiving, using a video information source, a color video signal, having a first frame rate;
pre-processing, using a video pre-processing unit, the color video signal to produce a pre-processed color video stream;
detecting objects of interest in the pre-processed color video stream using a trained artificial neural network unit;
assembling, using a service data assembling unit, information about the detected objects of interest into service data;
transforming, using a sketch-video converter unit, the pre-processed color video stream into a sketch stream, the sketch stream being monochromatic;
adapting, using an interpolator-based frame decimator unit, the first frame rate of the sketch stream to a second frame rate;
producing, using a first encoder unit, an encoded sketch stream using the sketch stream;
receiving, using a first switch unit, frame-hints using the pre-processed color video stream;
encoding, using a second encoder unit, the frame-hints to produce encoded frame-hints;
multiplexing, at a multiplexer unit, the encoded sketch stream with the encoded frame-hints and the service data to produce multiplexer output data; and
transmitting, from the multiplexer unit, the multiplexer output data via a communication channel or storing the multiplexer output data in a data storage system.

17. The method of claim 16, further comprising:
encoding a first frame from the pre-processed color video stream to produce a first frame-hint of the frame-hints, the first frame-hint comprising color.

18. The method of claim 17, further comprising:
encoding a second frame from the pre-processed color video stream to produce a second frame-hint of the frame-hints, the second frame-hint comprising color, the second frame being encoded upon determining that a first scene depicted by the pre-processed color video stream has changed, the second-frame hint corresponding to a second scene depicted by the pre-processed color video stream.

19. The method of claim 16, further comprising:
demultiplexing, using a demultiplexer unit, the multiplexer output data to retrieve the encoded sketch stream, the encoded frame-hints, and the service data;
decoding, using a first decoder unit, the encoded frame-hints to produce the frame-hints;
decoding, using a second decoder unit, the encoded sketch stream to produce a decoded sketch stream;
producing, by a missed frame addition unit, an interpolated sketch stream using the decoded sketch stream and the service data, a frame rate of the interpolated sketch stream being equal to the first frame rate; and
producing, by a trained complex artificial neural network, a first scene of a restored video stream using the interpolated sketch stream and a first frame-hint from the frame-hints, the first scene of the restored video stream comprising color.

20. The method of claim 19, further comprising:
receiving the first frame-hint at an artificial neural network for additional training of the artificial neural network;
receiving the interpolated sketch stream at the artificial neural network for additional training of the trained artificial neural network; and
producing the first scene of the restored video stream using the trained artificial neural network based on the interpolated sketch stream and the first frame-hint.

\* \* \* \* \*